United States Patent [19]

Nakaishi et al.

[11] Patent Number: 5,781,985
[45] Date of Patent: Jul. 21, 1998

[54] METHOD OF MAKING A GYRO APPARATUS

[75] Inventors: Takafumi Nakaishi; Takeshi Hojo. both of Kuroiso; Takao Murakoshi. Ogawa-machi; Isao Masuzawa; Shigeru Nakamura. both of Kuroiso; Kazuaki Tani. Yaita. all of Japan

[73] Assignee: Tokimec Inc., Tokyo. Japan

[21] Appl. No.: 418,657

[22] Filed: Apr. 10, 1995

Related U.S. Application Data

[62] Division of Ser. No. 268,647, Jun. 30, 1994.

[30] Foreign Application Priority Data

Jul. 6, 1993 [JP] Japan ................................. 5-166945

[51] Int. Cl.$^6$ .................................................... H01F 41/00
[52] U.S. Cl. ........................... 29/602.1; 29/592.1; 29/596
[58] Field of Search ........................ 29/592.1, 596, 29/602.1; 74/5.6 D, 5.42, 5.8, 5 R; 73/504.08, 514.18

[56] References Cited

U.S. PATENT DOCUMENTS 3,902,374  9/1975  Hoffman et al. ..................... 74/5.6 D
5,353,656  10/1994  Hawkey et al. ..................... 74/5.6 D

*Primary Examiner*—Carl E. Hall
*Attorney, Agent, or Firm*—Bauer & Schaffer

[57] ABSTRACT

An acceleration detection gyro apparatus is of the electrostatic supporting type. This gyro apparatus call be made inexpensive. long in life. excellent in durability and can be applied to a wide variety of fields. A gyro rotor (20) is supported relative to a gyro case (21) by an electrostatic supporting force in a non-contact fashion and rotated about the spin axis along the Z axis by a rotor driving system. The gyro rotor (20) is disk-shaped and constructed by forming metal thin film electrodes on both surfaces of a plate member made of preferably an insulating material. The gyro apparatus includes a slave control system for slaving a displacement of the gyro rotor (20) relative to the gyro case (21) in the Z-axis direction (spin axis direction) and a central position control system for slaving a displacement of the gyro rotor (20) in the X-axis and Y-axon directions.

2 Claims, 11 Drawing Sheets

METHOD OF MAKING A GYRO APPARATUS

This is a Divisional of Ser. No. 08/268,647, filed Jun. 30, 1994.

BACKGROUND OF THE INVENTION

1. Field of the Invention

The present invention relates to an acceleration detection type gyro apparatus for use with navigation vehicles, such as automobiles, ships, air planes or the like, to detect an angular velocity, angular change and acceleration relative to inertia space. More particularly, this invention relates to an extremely miniaturized acceleration detection type gyro apparatus of the type that a gyro rotor is floated by an electrostatic supporting force.

2. Description of the Prior Art

FIG. 1 of the accompanying drawings shows an example of a conventional gyro apparatus. This gyro apparatus is what night be called an electrostatic gyro and includes a ball-shaped gyro rotor 1 which is floated by an electrostatic supporting force. A Z-axis represents a spin axis direction of such gyro rotor 1 and X-axis and Y-axis are perpendicular to each other and each of which is vertical to the Z-axis.

The ball-shaped gyro rotor 1 is accommodated within a ball-shaped cavity formed inside a gyro case 2 and the cavity is kept vacuum. The gyro case 2 comprises a pair of electrodes 3, 3' disposed along the X-axis direction, a pair of electrodes 4, 4' disposed along the Y-axis direction and a pair of electrodes 5, 5' disposed along the z-axis direction. Such electrodes are connected with an electrostatic supporting circuit (not shown).

The gyro rotor 1 is Supported to the gyro case 2 in a non-contact fashion by an electrostatic force generated by the three pairs of electrodes 3, 3'; 4, 4'; and 5, 5'. Four coils 6-1, 6-2, 6-3 and 6-4 are disposed along the equator (line in which the gyro rotor 1 crosses the XY plane) at an angular extent of 90°. The gyro rotor 1 is rotated about the Z axis as its spin axis by a rotary magnetic field generated by such coils.

A pattern (zigzag) 7 is printed on the whole of the equator of the gyro rotor 1 in the circumferential direction, and four optical pickups 8-1, 8-2, 8-3, 8-4 are disposed along the equator of the gyro rotor 1 at an angular spacing of 90° in response to the pattern 7. When the gyro rotor 1 is rotated about the X-axis, the Y-axis and the Z-axis, the optical pickups 8-1, 8-2, 8-3 and 8-4 detect displacements of the corresponding patterns to thereby detect an angular displacement of the gyro rotor 1.

When this gyro apparatus is actuated, an electrostatic force is generated by applying a voltage to the electrodes 3, 3', 4, 4', 5, 5' with the electrostatic supporting circuit, whereby the gyro rotor 1 is supported to the gyro case 2 in a non-contact fashion. Then, a rotary magnetic field in generated by applying an AC voltage to the four coils 6-1, 6-2, 6-3 and 6-4, whereby the gyro rotor 1 is rotated about the Z-axis as the spin axis at high speed. When a rotational speed of the gyro rotor 1 reaches to a predetermined value, although the Ac voltage is cut off, the gyro rotor 1 keeps rotating by the force of inertia during the period in which the gyro apparatus is in use. Since the gyro rotor 1 is supported in a non-contact fashion within the cavity of the gyro case 2 which is maintained vacuum, the gyro rotor 1 keeps rotating several months.

since any torque does not act on the gyro rotor 1 from the outside, regardless of the any movement of the gyro case 2, the spin axis direction of the gyro rotor 1 is maintained in the constant direction relative to the inertia space due to the law of inertia.

Therefore, if the relative displacement of the zigzag pattern 7 provided on the equator portion of the gyro rotor 1 relative to the gyro case 2 is detected by the optical pickups 8-1 through 8-4, then it is possible to detect with high accuracy the angular displacement of the navigation body which is equipped with the gyro case 2.

In the conventional gyro apparatus, the gyro rotor 1 should be produced as a complete ball-shaped member. If the complete ball-shape degree of the gyro rotor 1 is not perfect, the supporting force from the electrodes contains a torque component. Therefore, when an attitude angle thereof is changed, a drift occurs. As a result, it takes much labor and a lot of time to manufacture a ball-member in order to produce the gyro rotor 1 and a manufacturing cost is increased.

The electrostatic-supporting gyro holds its spin axis such that the spin axis constantly indicates a certain direction of the inertia space so that it is what might be called a rate integrating gyro. This type of gyro cannot directly detect an angular change and an angular velocity concerning a main axis of a navigation vehicle when the main axis of a vehicle is changed in angle relation to the control axis of the gyro.

OBJECTS AND SUMMARY OF THE INVENTION

It is, therefore, an object of the present invention to provide a gyro apparatus which can be made inexpensive.

It is another object of the present invention to provide a gyro apparatus in which a life thereof can be extended.

It is a further object of the present invention to provide a gyro apparatus which can be applied to a wide variety of fields.

According to an aspect of the present invention, there is provided an acceleration detection type gyro apparatus including a gyro rotor rotating about a spin axis at high speed and a gyro case which accommodates therein the gyro rotor supported by an electrostatic supporting force in a non-contact fashion. The gyro rotor being disk-shaped is comprised of electrode portions formed on both surfaces of the gyro rotor along the circumferential direction thereof, four pairs of electrostatic electrodes disposed in an opposing relation to the electrode portions formed on both surfaces of the gyro rotor and spaced apart from the electrode portions at an angular extent of 90° in the circumferential direction of the gyro case, a displacement detecting apparatus for detecting a displacement of the gyro rotor relative to the gyro case in two radial directions perpendicular to a central axis of the gyro case and which are perpendicular to each other, a rotor driving system for rotating the gyro rotor about the spin axis at high speed, a slave control system including the four pairs of electrostatic electrodes and the electrode portions of the gyro rotor and slaving a displacement of the gyro rotor in the direction along the central axis, and a central position control system including the four pairs of electrostatic electrodes and the displacement detecting apparatus for controlling the gyro rotor to be matched with the central axis, According to another aspect of the present invention, there is provided a method of manufacturing a gyro apparatus comprising a thin disk-shaped gyro rotor and a gyro case for accommodating therein the gyro rotor. The method is comprised of the steps of forming metal thin film electrodes on both surfaces of a thin plate member made of an insulating material by a thin film forming technique, and producing a gyro rotor by cutting the plate member in a circular fashion.

The above and other objects, features, and advantages of the present invention will become apparent from the following detailed description of illustrative embodiments thereof to be read in conjunction with the accompanying drawings, in which like reference numerals are used to identify the same or similar parts in the several views,

DETAILED DESCRIPTION OF THE PREFERRED EMBODIMENTS

Figure 1:
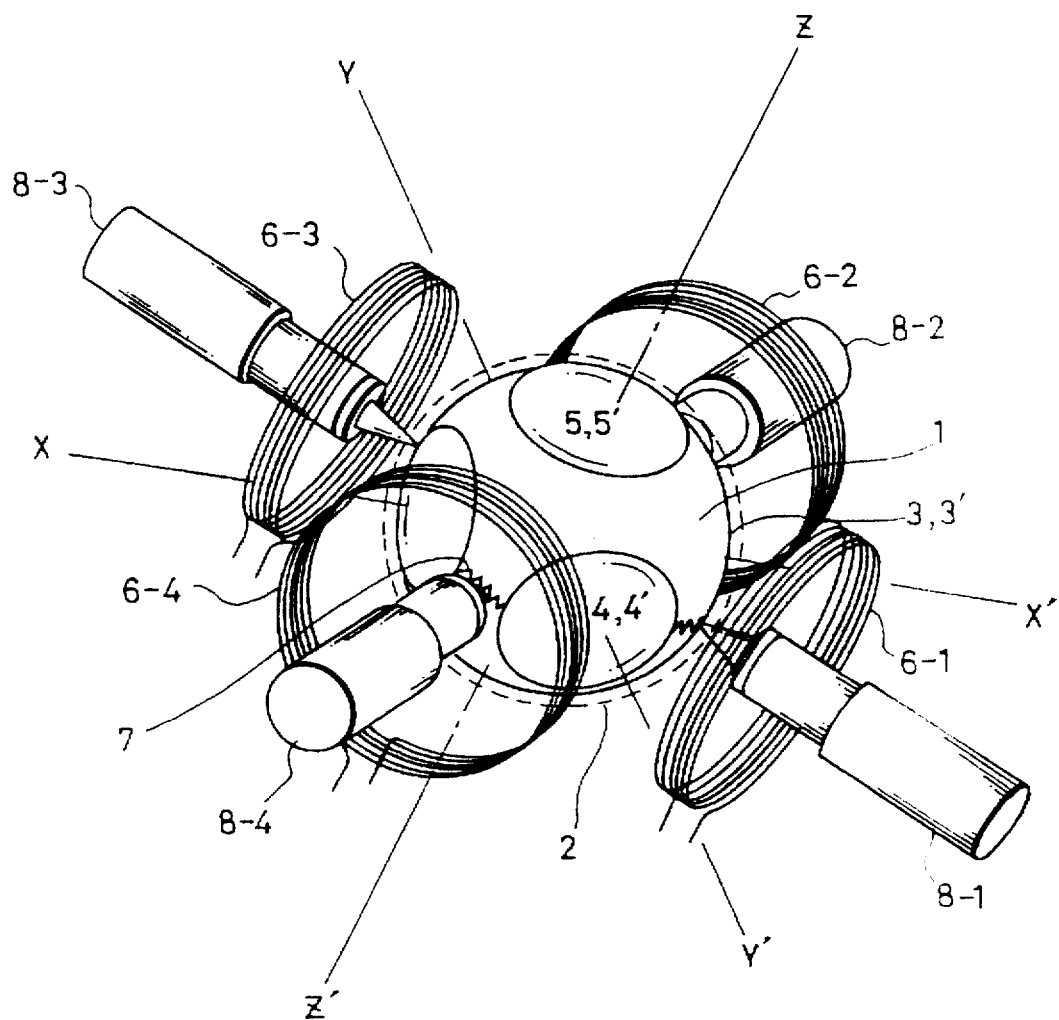
FIG. 1 is a perspective view showing an example of a conventional electrostatic type gyro apparatus.
Figure 2A:
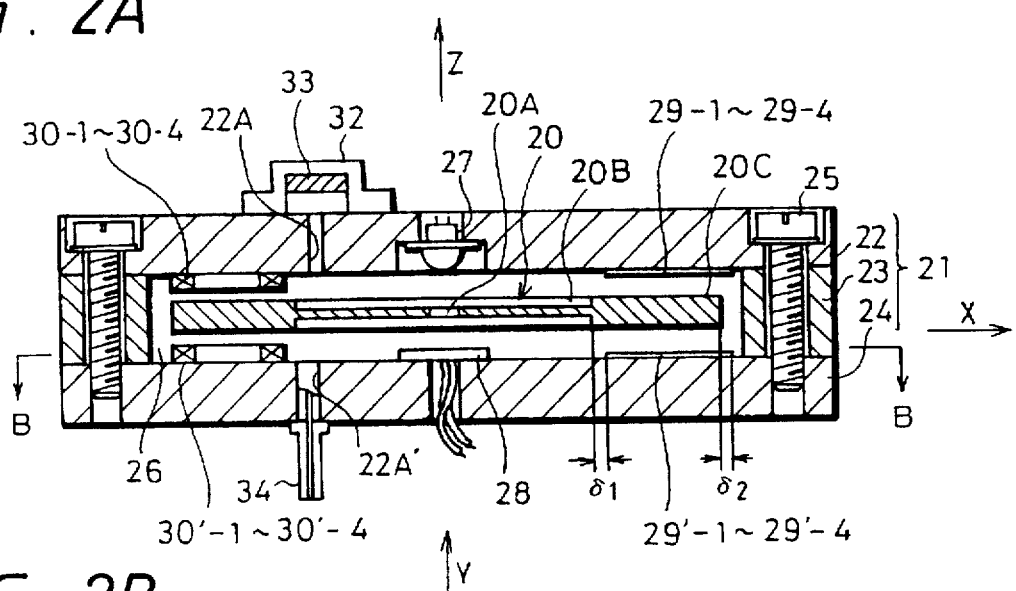
FIG. 2A is a cross-sectional view showing a gyro apparatus according to a first embodiment of the present invention.
Figure 2B:
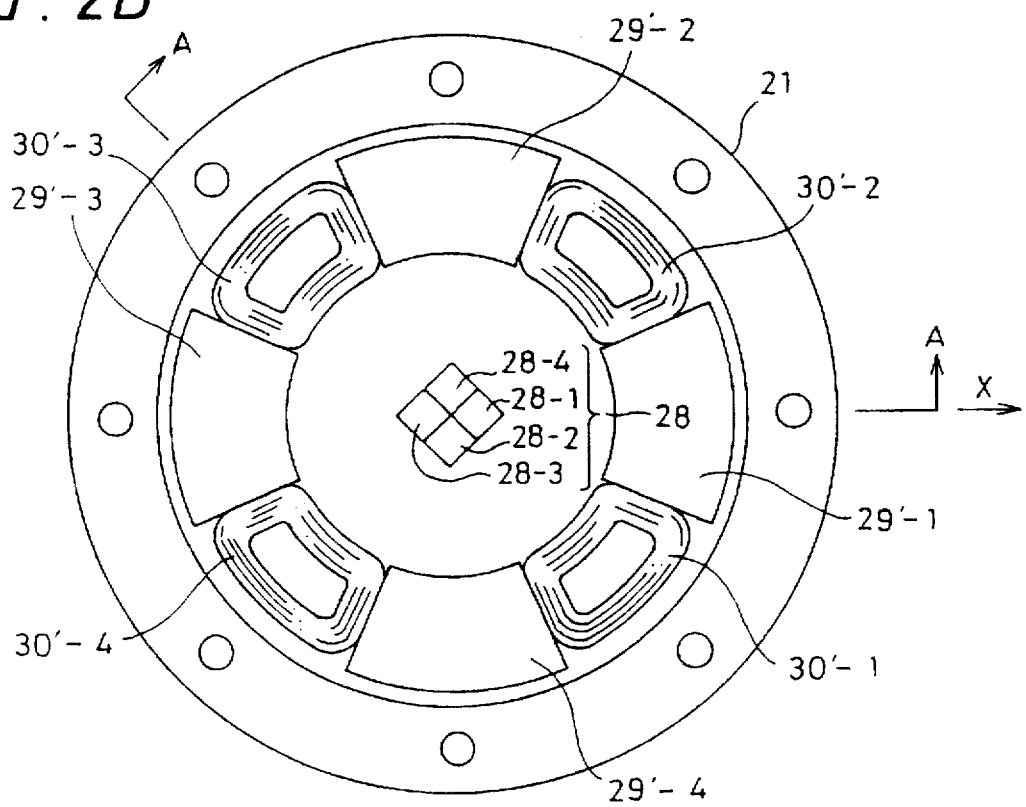
FIG. 2B is a plan view showing an example of a slave control system of a rotor driving system of the gyro apparatus according to the present invention.

The present invention will now be described with reference to FIGS. 2A, 2B through FIG. 11. FIGS. 2A, 2B show a gyro apparatus according to a first embodiment of the present invention. As shown in FIGS. 2A, 2B, the gyro apparatus according to the present invention includes a disk-shaped gyro rotor 20 and a gyro case 21 housing therein the gyro rotor 20.

XYZ coordinates are set for the gyro apparatus as shown in FIGS. 2A, 2B. A Z-axis is set in the upper direction along the central axis of the gyro apparatus and X-axis and Y-axis are set in the direction perpendicular to the Z-axis. The spin axis of the gyro rotor 20 is disposed along the Z-axis.

The gyro case 21 includes an upper side bottom member 22, a lower side bottom member 24 and an annular spacer 23 which joins the upper side bottom member 22 and the lower side bottom member 24. The upper side bottom member 22, the spacer 23 and the lower side bottom member 24 may be coupled by some suitable fastening means, such as small screws 25 or the like. In this way, a disk-shaped cavity portion 26 in which the gyro rotor 20 is accommodated is formed in the inside of the gyro case 21.

As shown in FIG. 2A; the upper side bottom member 22 and the lower side bottom member 24 have bored therethrough holes 22A, 22A' which communicate with the cavity portion 26. The hole 22A of the upper side bottom member 22 is covered with a cap 32 and the cap 32 houses therein a getter member 33 in order to maintain the cavity portion 26 in the high vacuum degree for a long period of time. The hole 22A' of the lower side bottom member 24 is connected with a pipe 34, and the cavity portion 26 is evacuated and kept in vacuum by means of the pipe 34.

The gyro rotor 20 is made of a conductive material. As shown in FIG. 2A, it is preferable that the gyro rotor 20 includes a thin central portion 20B and a thick annular electrode portion 20C formed outside the thin central portion 20B. A through-hole 20A is bored through the central portion 20B along its central axis.

The gyro rotor 20 according to this embodiment may be made of single crystal silicon, for example. If the gyro rotor 20 is made of the single crystal material, then it is possible to provide a gyro rotor of high accuracy which is difficult to be distorted by heat and which Is difficult to be affected by aging change. The gyro rotor 20 according to this embodiment can be mass-produced inexpensively with high accuracy by lithography, for example. Further, the upper side bottom member 22, tile spacer 23 and the lower side bottom member 24 also can be mass-produced inexpensively by lithography.

The gyro apparatus includes a displacement detecting apparatus for detecting a displacement of the gyro rotor 20 relative to the gyro case 21. The displacement detecting apparatus detects a displacement of the gyro rotor 20 in the radial direction. As shown in FIG. 2A, the displacement detecting apparatus may include a light emitting device 27 and a photo sensing device 28 disposed on the upper and lower surfaces of the inside of the cavity portion 26 of the gyro case 21. The photo sensing device 28 may preferably be of the quadrant type which comprises four segments 28-1, 28-2, 28-3 and 28-4 as shown in FIG. 2B.

The light emitting device 27 and the photo sensing device 28 are disposed at respective ends of the hole 20A of the gyro rotor 20 such that a light path thereof passes through the hole 20A of the gyro rotor 20. When the gyro rotor 20 is displaced in the radial direction; the position of the hole 20A is deviated from the light path se that, of light emitted by the light emitting device 27, an amount of light sensed by the photo sensing device 28 is changed. In this way, the magnitude and direction in which the gyro rotor 20 is displaced in tho radial direction are obtained by the four photo sensing device segments.

The upper side bottom member 22 includes on its inner surface electrostatic supporting electrodes 29-1 through 29-4 and rotor rotating drive coils 30-1 through 30-4 disposed coaxially. Similarly, the lower side bottom member 24 includes on its inner surface electrostatic supporting electrodes 29'-1 through 29'-4 and rotor rotating drive coils 30'-1 through 30'-4 disposed coaxially. The electrostatic supporting electrodes 29-1 to 29-4, 29'-1 to 29'-4 and the rotor rotating drive coils 30-1 to 30-4, 30'-1 to 30'-4 are spaced apart from the electrode portion 20C of the gyro rotor 20 in an opposing relation. Positional relationship among the electrostatic supporting electrodes 29-1 to 29-4, 29'-1 to 29'-4 and the electrode portion 20C of the gyro rotor 20 will be described more fully later on.

As shown in FIG. 2B, a pair of first electrostatic supporting electrodes 29-1, 29'-1 and a pair of third electrostatic supporting electrodes 29-3, 29'-3, for example, are disposed along the X axis, and a pair of second electrostatic supporting electrodes 29-2, 29'-2 and a pair of fourth electrostatic supporting electrodes 29-4, 29'-4 are disposed along the Y axis. The electrostatic supporting electrodes 29-1 to 29-4, 29'-1 to 29'-4 may be disposed in the spaces between the adjacent rotor rotating drive coils 30-1 to 30-4, 30'-1 to 30'-4. The electrostatic supporting electrodes 29-1 to 29-4 and 29'1 to 29'-4 are preferably formed to ba arcuate as shown in FIG. 2B.

Arrangements and operation of a slave control system, a rotor driving system 100 and a central position control system provided in the gyro apparatus according to the embodiment of the present invention will be described with reference to FIG. 3 and, FIGS. 4A, 4B. The slave control system functions to constrain the displacement of the gyro rotor 20 in the Z-axis direction; the rotor driving system 100 function to rotate the gyro rotor 20 around the spin axis; and the central position control system functions to constrain the displacement of the gyro rotor 20 in the XY-axis direction.

Initially, the arrangement and operation of the slave control system provided in the gyro apparatus according to this embodiment will be described with reference to FIG. 3 and FIGS. 4A, 4B. The slave control system according to this embodiment is of the electrostatic type so that the gyro rotor 20 is supported in a floating fashion and slaved by a force of static electricity generated between the gyro rotor 20 and the electrostatic supporting electrodes.

Figure 3:
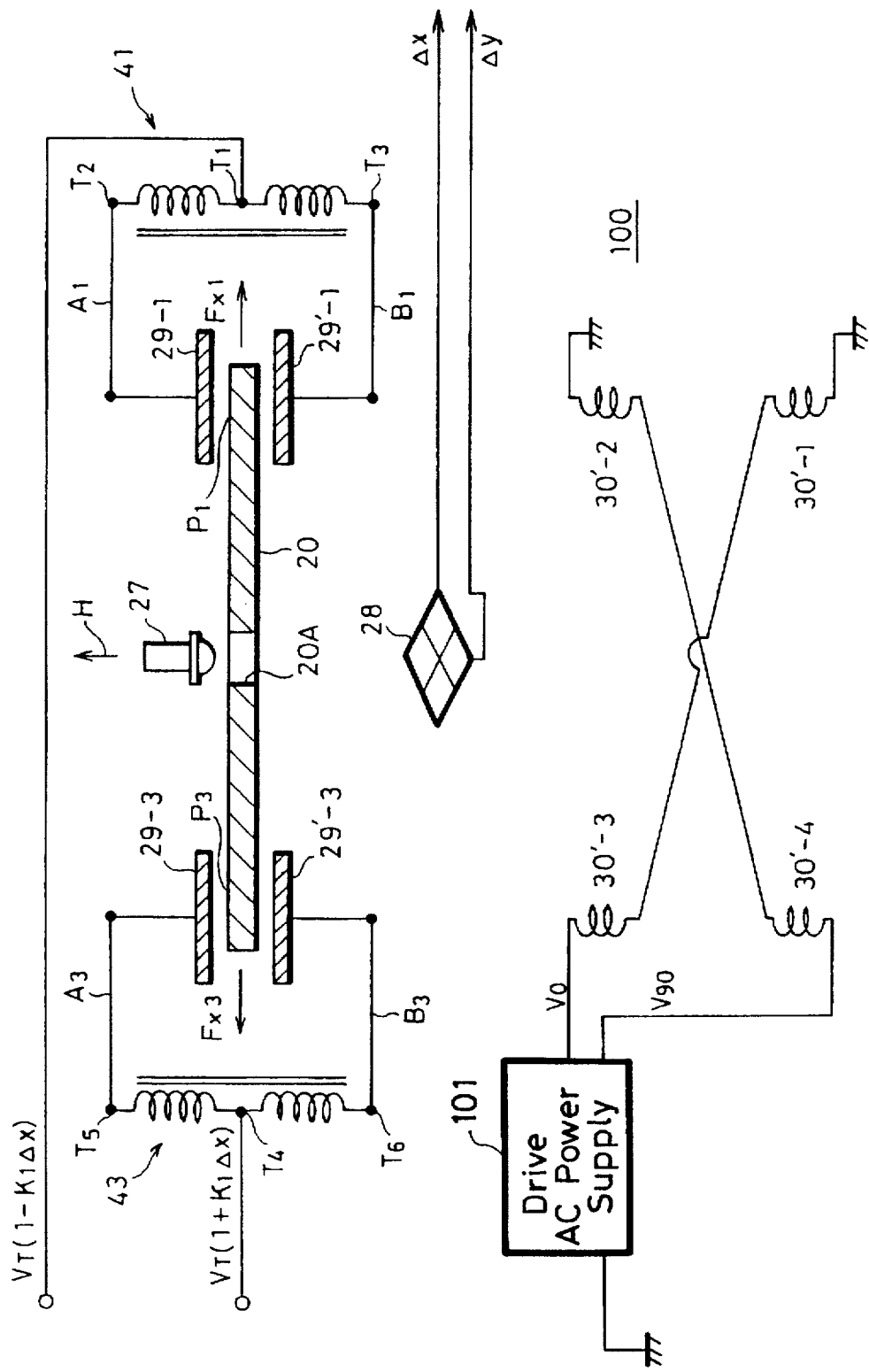
FIG. 3 is a diagram showing an example of a slave control system and an example of a rotor driving system of the gyro apparatus according to the present invention.
Figure 4A:
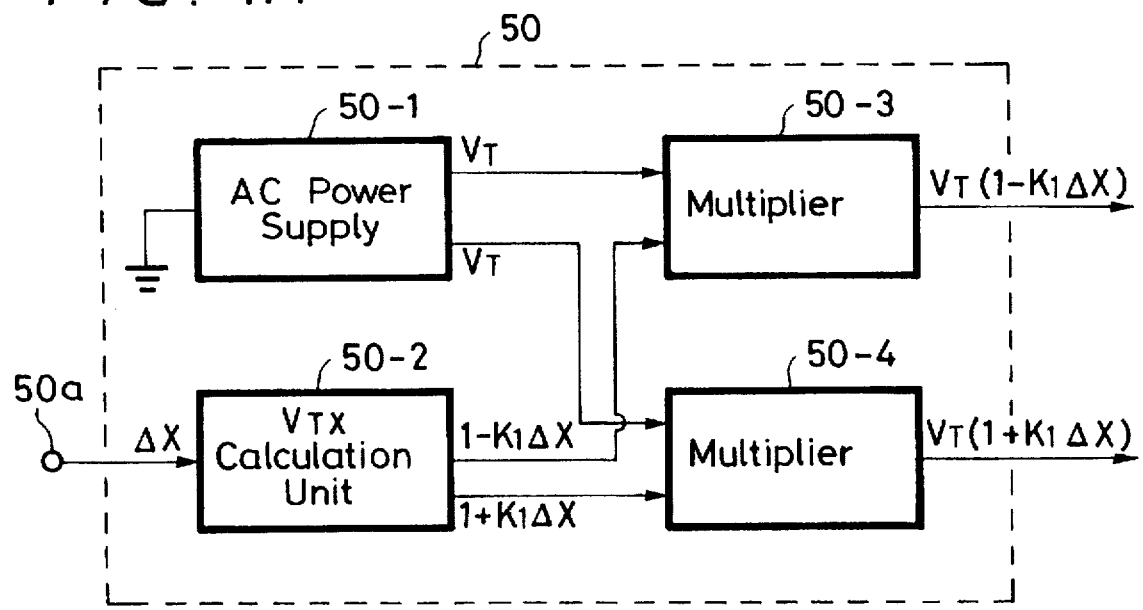
FIGS. 4A and 4B are respectively block diagrams showing an example of an X-control system and an example of a Y-control system.
Figure 4B:
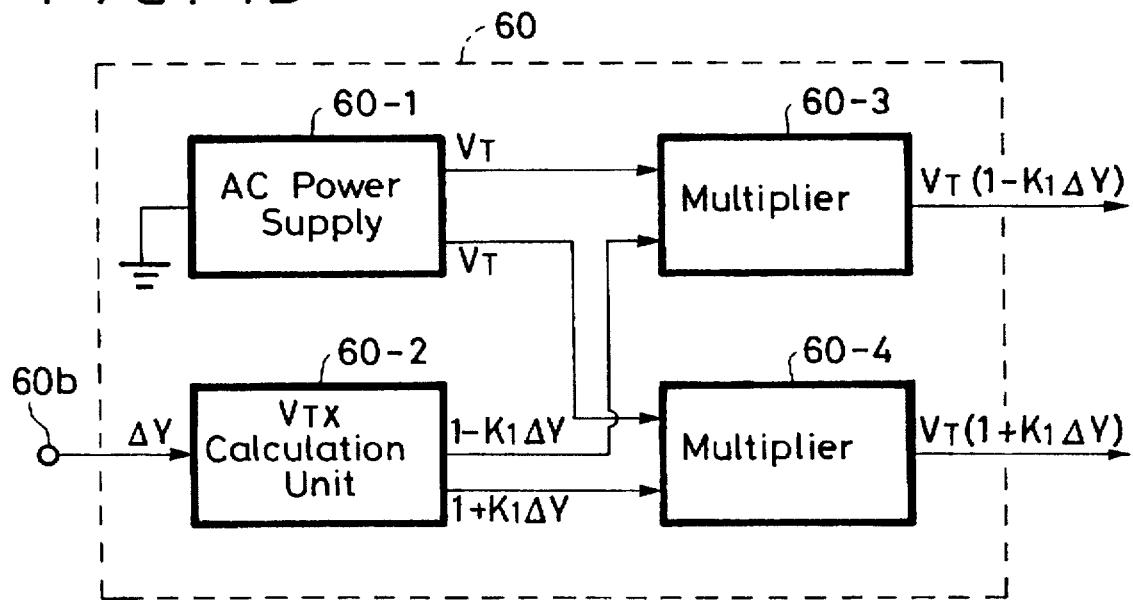

The slave control system according to this embodiment includes the electrode portion 20C (portions $P_i$, $P_3$ in FIG. 3) of the gyro rotor 20, 4 pairs of the electrostatic supporting electrodes 29-1, 29'-1; 29-2, 29'-2; 29-3, 29'-3; and 29-4, 29'-4 (only electrostatic supporting electrodes 29-1, 29'-1 and 29-3, 29'-3 are shown in FIG. 3) disposed on the respective sides of the gyro rotor 20, 4 transformers 41, 42, 43 and 44 (only transformers 41, 43 are shown in FIG. 3) connected respectively to such electrostatic supporting electrodes, and an X-control system 50 and a Y-control system 60, as shown in FIGS. 4A, 4B.

Of the electrode portion 20C of the gyro rotor 20, the first portion $P_1$ represents a portion which corresponds to the first pair of electrostatic supporting electrodes 29-1, 29'-1, the second portion $P_2$ represents a portion which corresponds to the second pair of electrostatic supporting electrodes 29-2, 29'-2, the third portion $P_3$ represents a portion which corresponds to the third pair of electrostatic supporting electrodes 29-3, 29'-3 and the fourth portion $P_4$ represents a portion which corresponds to the fourth pair of electrostatic supporting electrodes 29-4, 29'-4.

The X-control system 50 function so that the displacements of the first and third portions $P_1$, $P_3$ of the electrode portion 20C of the gyro rotor 20 in the Z-axis direction are constantly hold at zero. The Y-control system 60 function so that the displacements of the second and fourth portions $P_2$, $P_4$ of the electrode portion 20C of the gyro rotor 20 in the Z-axis direction are constantly held at zero.

As shown in FIG. 4A, the X-control system 50 includes an AC power supply 50-1 for supplying an AC voltage $V_T$, a $V_{TX}$ calculation unit 50-2 and two multipliers 50-3, 50-4. The $V_{TX}$ calculation unit 50-2 is supplied with a signal indicative of a displacement $\Delta x$ of the gyro rotor 20 in the X-axis direction from the photo sensing device 28 of the displacement detecting apparatus and calculates coefficients $1\pm K_1\Delta x$ ($K_1$ is a constant). The AC power supply 50-1 is grounded at its one end and connected at another end to the two multipliers 50-3, 50-4. In this way, the two multipliers 50-3, 50-4 output AC voltages $V_T(1\pm K_1\Delta x)$ that had been corrected by the coefficients $1\pm K_1\Delta x$.

As shown in FIG. 3, output terminals of the two multipliers 50-3, 50-4 of the X-control system 50 are respectively connected to taps T1, T4 of the first and third transformers 41, 43. Output terminals T2, T3 of the first transformer 41 are respectively connected to the electrostatic supporting electrodes 29-1, 29'-1. Output terminals T5, T6 of the third transformer 43 are respectively connected to the electrostatic supporting electrodes 29-3, 29'-3.

A resonance circuit is formed-of the AC power supply 50-1 of the X-control system 50 (with frequency $f_0$), the two transformers 41, 43 (L is the inductance of each of the transformers 41, 43), and a capacitor (C is the electrostatic capacitance) composed of the two pairs of the electrostatic supporting electrodes and the electrode portion 20C of the gyro rotor 20. A resonance frequency $f_a$ [$=\frac{1}{2}\pi\sqrt{(LC)}$] of the resonance circuit is set to be a value smaller than the frequency $f_0$.

Figure 5:
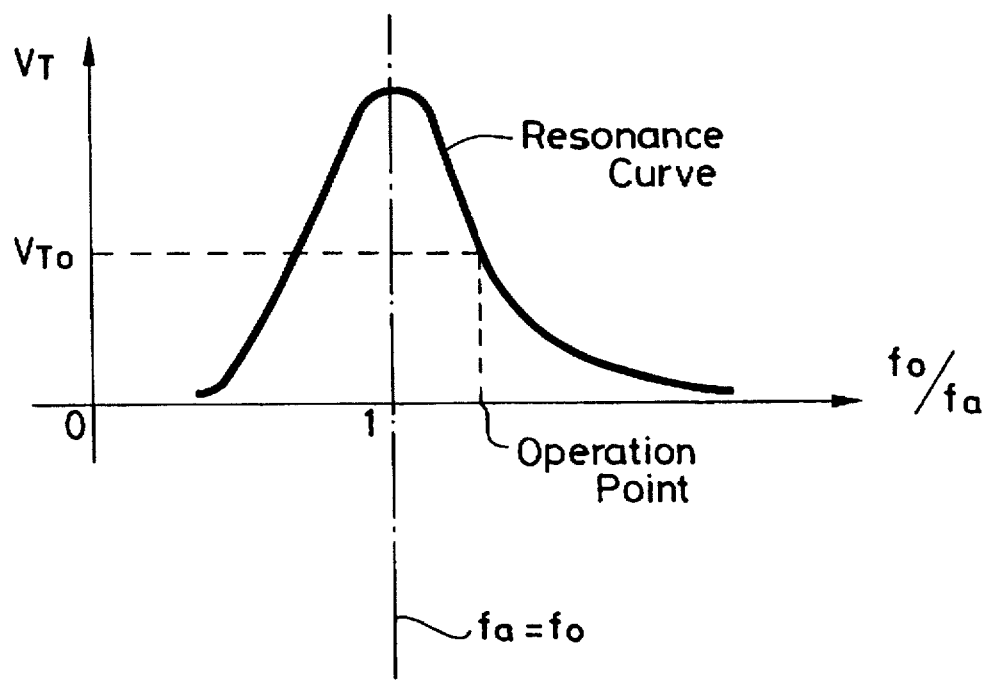
FIG. 5 is a graph used to explain how an electrostatic force acts on the axis of the gyro apparatus according to the present invention.

Operation of the slave control system of the gyro apparatus according to the embodiment of the present invention will be described below with reference to FIG. 5. FIG. 5 is a graph of measured results of a resonance characteristic curve, and to which reference will be made in explaining operation of the resonance system including the first transformer 41 and the electrostatic supporting electrodes 29-1, 29'-1 connected to the first transformer 41. Tn FIG. 5, the vertical axis represents the electrode voltage $V_T$ of one electrode, e.g., the electrostatic supporting electrode 29-1 disposed on the upper side of the gyro rotor 20, and horizontal axis represents a frequency ratio ($f_0/f_a$) where $f_0$ is the frequency or the AC power supply 50-1 and $f_a$ is the resonance frequency $f_a$ [$=\frac{1}{2}\pi\sqrt{(LC)}$]. The coefficients output from the $V_{TX}$ calculation unit 50-2 to the two multipliers 50-31 50-4 are represented an ($1\pm K_1\Delta x$)=1 for simplicity.

Let it be considered the case that the first portion $P_1$ of the electrode portion 20C of the gyro rotor 20 is displaced in the upper direction. In this case, a distance between the first portion $P_1$ and the electrostatic supporting electrode 29-1 disposed over the first portion $P_1$ is reduced and the electrostatic capacitance C between the first portion $P_1$ and the electrostatic supporting electrode 29-1 is increased. Therefore, the resonance frequency $f_a$ [$=\frac{1}{2}\pi\sqrt{(LC)}$] is decreased and the frequency ratio ($f_0/f_a$) is increased with the result that the electrode voltage $V_T$ of the electrostatic supporting electrode 29-1 becomes smaller than the operation voltage $V_{TO}$ as shown in FIG. 5. In this way, an attraction acting between the upper side electrostatic supporting electrode 29-1 and the first portion $P_1$ of the gyro rotor 20 is reduced.

A relationship between the first portion $P_1$ of the gyro rotor 20 and the electrostatic supporting electrode 29'-1 disposed under the first portion $P_1$ becomes exactly opposite to the above-mentioned relationship. Specifically, a distance between the first portion $P_1$ and the electrostatic electrode 29'-1 disposed under the first portion $P_1$ is increased and the electrostatic capacitance C therebetween is decreased. Therefore, the resonance frequency $f_a$ [$=\frac{1}{2}\pi\sqrt{(LC)}$] is increased and the frequency ratio ($f_0/f_a$) is decreased with the result that the electrode voltage $V_T$ of the electrostatic supporting electrode 29'-1 becomes larger than the operation voltage $V_{TO}$. In this way, an attraction acting between the lower side electrostatic supporting electrode 29'-1 and the first portion $P_1$ of the gyro rotor 20 is increased.

When the first portion $P_1$ of the gyro rotor 20 is displaced in the upper direction, a force for displacing the first portion $P_1$ in the upper direction is reduced and a force for displacing the first portion $P_1$ in the lower direction is increased so that the first portion $P_1$ is displaced relatively in the lower direction and returned to the original position.

According to the slave control system according to the embodiment of the present invention, the system which includes the AC power supply 50-1, the transformer 41 and the first pair of electrostatic supporting electrodes 29-1, 29'-1 functions that the displacement of the first portion $P_1$ of the electrode portion 20c of the gyro rotor 20 in the Z-axis direction is constantly maintained to be zero. A force Fp1 that is received by the first portion $P_1$ of the gyro rotor 20 from the gyro case 21 corresponds to a difference between voltages $A_1$, $B_1$ applied to the electrostatic supporting electrodes 29-1, 29'-1 of the upper and lower sides. Therefore, a first equation of the following equations (1) is established:

$$Fp1=K(A_1-B_1)$$
$$Fp2=K(A_2-B_2)$$
$$Fp3=K(A_3-B_3)$$
$$Fp4=K(A_4-B_4) \quad (1)$$

where K is the constant.

Operation of the third portion $P_3$ and operations of the second and fourth portions $P_2$, $P_4$ of the electrode portion 20C of the gyro rotor 20 are similar to the operation of the first portion $P_1$. Accordingly, the second to fourth equations in the equations (1) are established.

An arrangement and operation of the rotor driving system 100 according to the embodiment of the present invention will be described below. The rotor driving system 100 includes the gyro rotor 20, a driving AC power supply 101 and 4 pairs of coils (only the lower-side coils 30'-1, 30'-2, 30'-3 and 30'-4 are illustrated in FIG. 3) connected to the driving AC power supply 101. A fundamental phase $V_0$ of a two-phase AC voltage is connected to the two coils 30'-1, 30'-3 connected in series and a 90° phase $V_{90}$ of the two-phase voltage is connected to the two coils 30'-2, 30'-4 connected in series.

When an alternating voltage is applied to the 4 pairs of the coils 30-1, 30'-1; 30-2, 30'-2; 30-3, 30'-3; and 30-4, 30'-4 from the driving AC power supply 101, a rotary magnetic field proportional to the frequency of the driving AC power supply 101 is generated in the cavity portions 26 of the gyro case 21 and the gyro rotor 20 is rotated due to a mutual action of the above-mentioned magnetic field and an eddy current generated within the gyro rotor 204

An arrangement and operation of the central position control system of the gyro apparatus according to the present invention will be described below. The central position control system includes the displacement detecting apparatus which comprises the light emitting device 27 and the photo sensing device 28, the electrode portion 20C of the gyro rotor 20, the electrostatic supporting electrodes 29-1 to 29-4, 29'-1 to 29'-4, and the X- and Y-control systems 50 and 60 for receiving the output signal from the displacement detecting apparatus. Even when the gyro rotor 20 is displaced in the X-axis direction and in the Y-axis direction, the central position control system controls the positions of the gyro rotor 20 in the X-axis and Y-axis directions ouch that the spin axis is matched with the central axis, i.e., Z-axis of tho gyro apparatus.

A positional relationship among the electrode portion 20C of the gyro rotor 20 and the electrostatic supporting electrodes 29-1 to 29-4, 29'-1 to 29'-4 will be described. Although the electrode portion 20c of the gyro rotor 20 is coaxially disposed relative to the electrostatic supporting electrodes 29-1 to 29-41 , 29'-1, 29'-4, it is also disposed with a deviation to the inner direction or outer direction or the radial direction at the same time.

A positional relationship in the case that the electrode portion 20C of the gyro rotor 20 is deviated from the electrostatic supporting electrodes 29-1 to 29-4, 29'-1 to 29'-4 in the inner direction of the radial direction as shown in FIGS. 2A, 2B and FIG. 3 will be described. As illustrated, the outer diameter of the electrostatic supporting electrodes 29-1 to 29-4, 29'-1 to 29'-4 is made larger than that of the electrode portion 20c of the gyro rotor 20 so that the electrostatic supporting electrodes are projected from the gyro rotor 20 to the outside in the radial direction by a length $\delta_2$.

Further, the inner diameter of the electrostatic supporting electrodes 29-1 to 29-4, 29'-1 to 29'-4 is formed larger than that of the electrode portion 20C of the gyro rotor 20 so that the electrode portion 20C of the gyro rotor 20 is projected from the electrostatic supporting electrodes 29-1 to 29-4, 29'-1 to 29'-4 to the inside in the radial direction by a length $\delta_1$.

The electrode portion 20C of the gyro rotor 20 is displaced from the electrostatic supporting electrodes 29-1 to 29-4, 29'-1 to 29'-4 to the inside in the radial direction, whereby a force Fx1 is acted on tho gyro rotor 20 to the outside thereof in the radial direction (positive direction in the X-axis) by the first pair of the electrostatic supporting electrodes 29-1, 29'-1 and a force Fx3 is acted thereon to the outside thereof in the radial direction (negative direction of the X-axis) by the third pair of the electrostatic supporting electrodes 29-3, 29'-3. The forces Fx1 and Fx3 are changed depending on the magnitude of the AC voltage applied to the taps T1, T4 of the transformers 41, 43. If such AC voltages are equal, then the two forces Fx1, Fx3 are equal and balanced.

Let it be assumed that the gyro rotor 20 is displaced from the gyro case 21 by $\Delta x$ in the positive direction of the X axis when an acceleration $\alpha x$ in the X axis direction acts on the gyro rotor 20. Then, the displacement $\Delta x$ is output by the photo sensing device 28 as a voltage signal. The voltage signal is supplied to the $V_{TX}$ calculation unit 50-2 of the X-control system 50 which generates a signal indicative of the coefficients $1 \pm K_1 \Delta x$. Thus, the two multipliers 50-3, 50-4 generate different voltage signals $(1-K_1 \Delta x)V_T$, $(1+K_1 \Delta x)V_T$, respectively.

The above-mentioned voltage signals $(1 \pm K_1 \Delta x)V_T$ are respectively applied to the taps T1, T4 of the two transformers 41, 43. Therefore, the first pair of electrostatic supporting electrodes 29-1, 29'-1 generate the force Fx1 and the third pair of electrostatic supporting electrodes 29-3, 29'-3 generate the force Fx3. The force Fx1 in the positive direction of the X axis acting on the gyro rotor 20 and the force Fx3 in the negative direction of the X axis acting on the gyro rotor 20 are expressed by the following equations (2), respectively:

$$Fx1=k_1 (1-K_1\Delta x)V_T$$
$$Fx3=k_1 (1+K_1\Delta x)V_T \quad (2)$$

where $k_1$ is the constant. Therefore, a resultant of forces in the X axis direction acting on the gyro rotor 20 is expressed as:

$$Fx1-Fx3=-2k_1K_1V_T\Delta x \quad (3)$$

As shown by the above equation (3), the gyro rotor 20 is pulled by the force proportional to the displacement Δx in the negative direction of the X axis and the displacement of the gyro rotor 20 becomes zero. This is also similar-to the case that the gyro rotor 20 is deviated in the Y-axis direction. In this way, the central position control system according to the embodiment of the present invention can maintain the displacement amounts Δx and Δy at zero constantly even when the gyro rotor 20 is deviated in the X-axis direction and in the Y-axis direction. Specifically, the spin axis of the gyro rotor 20 is constantly matched with the central axis of the gyro apparatus, i.e., the Z axis under the control.

While the electrode portion 20C of the gyro rotor 20 is deviated from the electrostatic supporting electrodes 29-1 to 29-4, 29'-1 to 29'-4 to the inside thereof in the radial direction a shown in FIGS. 2A, 2B and FIG. 3, this is also true for the case that the electrode portion 20C of the gyro rotor 20 is deviated from the electrostatic supporting electrodes 29-1 to 29-4 and 29'-1 to 29'-4 to the outside thereof in the radial direction. In that case, the forces Fx1, Fx3 acting on the gyro rotor 20 are reversed in direction.

Figure 6A:
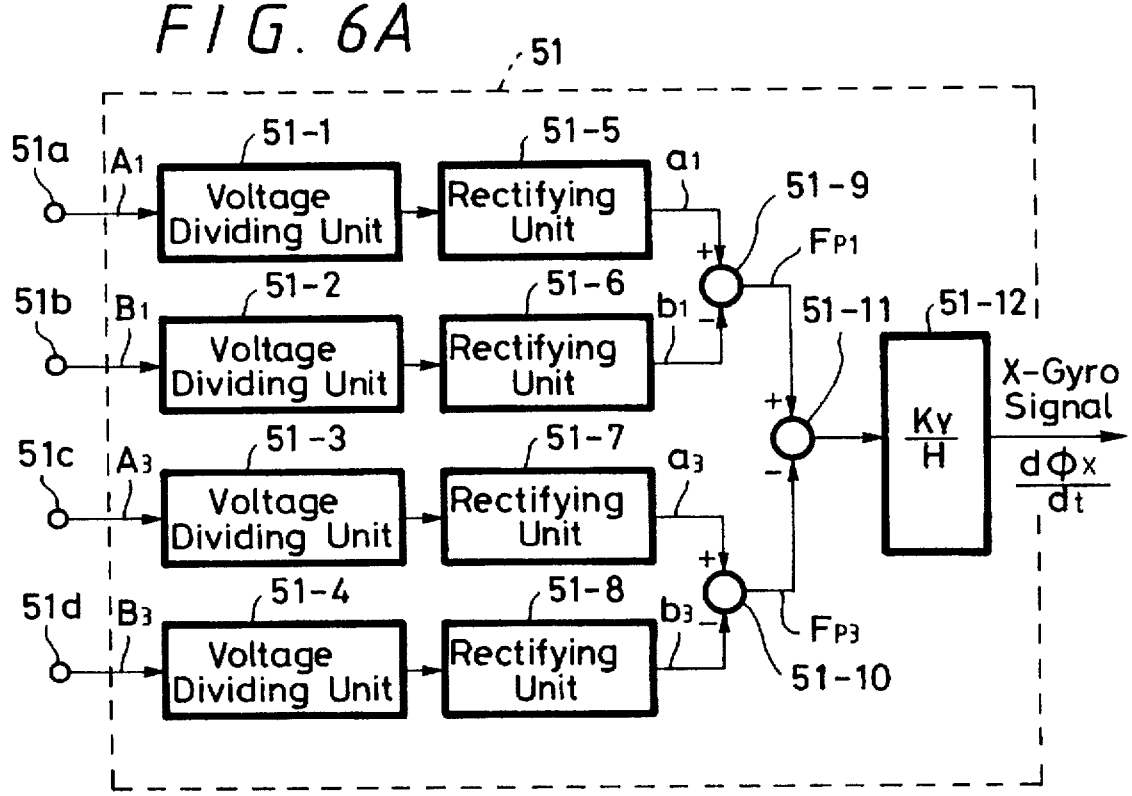
FIGS. 6A and 6B are respectively block diagrams showing an example of an X-gyro calculation unit and an X-acceleration calculation unit of the gyro apparatus according to the present invention.
Figure 6B:
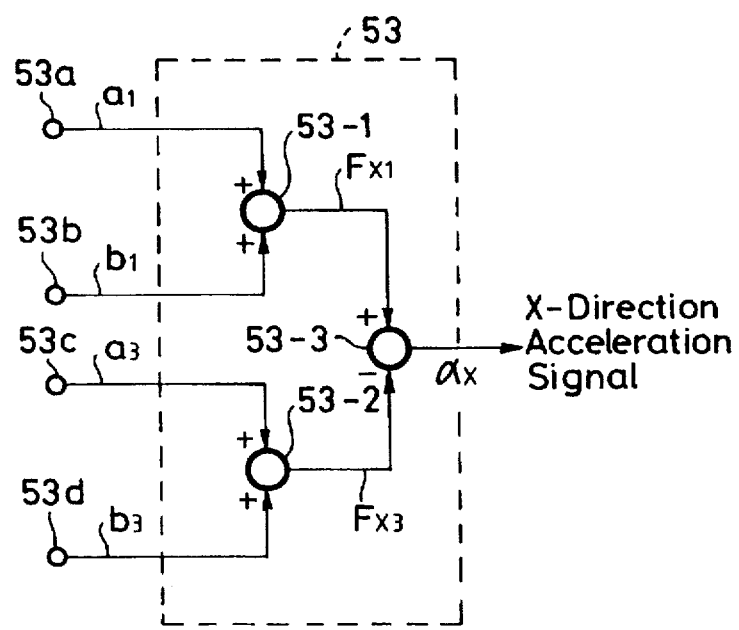
Figure 7A:
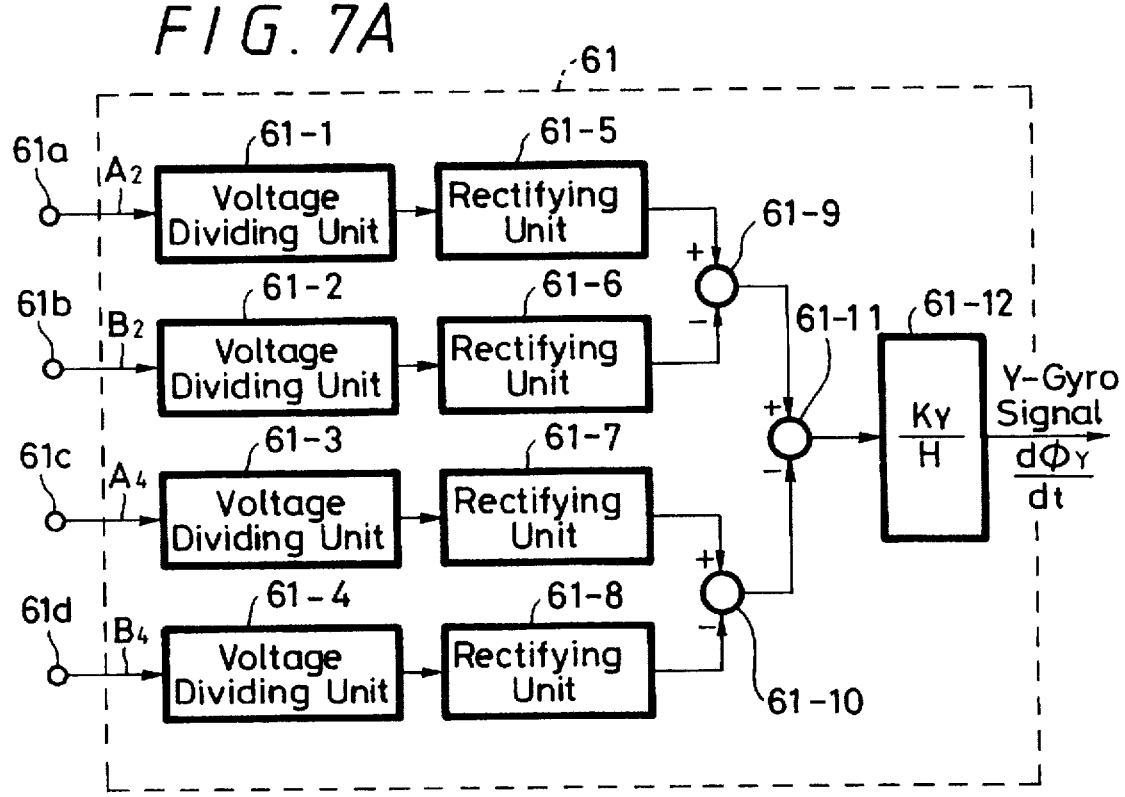
FIGS. 7A and 7b are respectively block diagrams showing an example of a Y-gyro calculation unit and an Y-acceleration calculation unit or the gyro apparatus according to the present invention.
Figure 7B:
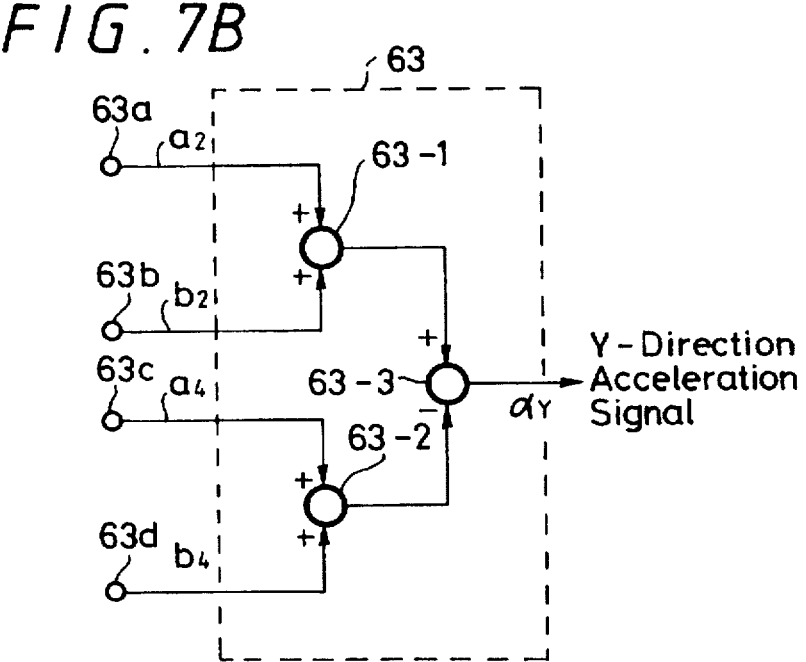

Arrangements and operations of a gyro calculation unit and an acceleration calculation unit according to the embodiment of the present invention will be described below with reference to FIGS. 6A, 6B to FIG. B. The gyro calculation unit includes an X-gyro calculation unit 51 for calculating an angular velocity $d\phi_x/dt$ generated around the X axis and an Y-gyro calculation unit 61 for calculating an angular velocity $d\phi_y/dt$ generated around the Y axis. The acceleration calculation unit includes an X-acceleration calculation unit 53 for calculating an acceleration in the X-axis direction, a Y-axis acceleration calculation unit 63 for calculating an acceleration in the Y-axis direction and a Z-axis acceleration calculation unit 73 for calculating an acceleration in the Z-axis direction.

Arrangements and operations of the X-gyro calculation unit 51 and the X-acceleration calculation unit 53 will be described with reference to FIGS. 6A, 6B. As shown in FIG. 6A, the X-gyro calculation unit 51 includes four voltage-dividing units 51-1 through 51-4, four rectifying units 51-5 to 51-8 connected to the respective voltage-dividing units, two subtracting units 51-9, 51-10 connected to the two pairs of rectifying units 51-5, 51-6 and 51-7, 51-8 and a third subtracting unit 51-11 connected to the two subtracting units 51-9, 51-10 and a calculation unit 51-12 connected to the unit 51-11.

The X-gyro calculation unit 51 is supplied with terminal outputs $A_1$, $B_1$ and $A_3$, $B_3$ from the output terminals T2, T3 and T5, T6 of the two transformers 41, 43 through input terminals 51a, 51b and 51c, 51d. Since the terminal outputs $A_1$, $B_1$ and $A_3$, $B_3$ at the output terminals T2, T3 and T5, T6 of the two transformers 41, 43 are generally high voltages of 1000 V or greater, such voltages $A_1$, $B_1$ and $A_3$, $B_3$ are divided by the four voltage-dividing units 51-1 to 51-4 into low voltages and rectified by the four rectifying units 51-5 to 51-8 into DC voltages. The resultant DC voltage signals are subtracted by the subtracting units 51-9, 51-10, 51-11. In this way, the calculation unit 51-12 generates at its output terminal the gyro signal indicative of the rotary angular velocity $d\phi_x/dt$ around the X-axis of the gyro rotor 20.

Operation of the X-gyro calculation unit 51 will be described below in detail. Let it be considered the case that the angular velocity $d\phi_x/dt$ is input around the X axis. In this case, an angular momentum vector H produced when the gyro rotor 20 effects the spin movement is represented in the upper direction along the z axis as shown in FIG. 3. Then, the spin axis of the gyro rotor 20 keeps being disposed along the Z-axis direction due to the law of inertia. When on the other hand the gyro case 21 is rotated around the X axis at the angular velocity of $d\phi_x/dt$, in the second pair of the electrostatic supporting electrodes 29-2, 29'-2 and the fourth electrostatic supporting electrodes 29-4, 29'-4, differences occur between the spacings of the second and fourth portions $P_2$, $P_4$ of the gyro rotor 20 and the upper side electrodes and the lower side electrodes. The differences between the upper and lower spacings are canceled by the operation of the Y-control system 60. At that time, two forces Fp2 and Fp4 which are opposite in the direction act on the second and fourth portions $P_2$, $P_4$ of the gyro rotor 20 along the Z axis, thereby generating a torque TX expressed by the following equation (4):

$$Tx=(Fp2-Fp4)\times r \quad (4)$$

where r is the distance from the spin axis to the force acting point.

Owing to the torque Tx, the spin axis of the gyro rotor 20 effects a precession around the Y axis with a small angle. The spacing between the first pair of the electrostatic supporting electrodes 29-1, 29'-1, the third pair of electrostatic supporting electrodes 29-3, 29'-3 and the first and third portions $P_1$, $P_3$ of the gyro rotor 20 are changed by such precession. That is, a difference occurs between the upper side spacing and the lower side spacing.

Similarly, the difference between the upper side spacing and the lower side spacing is controlled by the operation of the X-control system 50 to be zero. At that time, the two forces Fp1 and Fp3 of opposite directions act on the first and third portions $P_1$ and $P_3$ of the gyro rotor 20 to thereby generate a torque $T_x$ expressed by the following equation (5):

$$T_y=(Fp1-Fp3)\times r \quad (5)$$

Owing to the above-mentioned toque $T_y$, the spin axis of the gyro rotor 20 effects a precession around the X axis with a small angle. Such precession becomes the equal movement of the input angular velocity of $d\phi_x/dt$ with the result that the spin axis and the gyro case 21 are rotated around the X axis at the angular velocity of $d\phi_x/dt$.

Making an angular motion equation by the equations (4) and (5) and using the equation(1), we have:

$$\begin{aligned} H(d\phi_x/dt) &= (Fp3-Fp1)\times r \\ &= [(A_3-B_3)-(A_1-B_1)]\times r \times K \\ H(d\phi_y/dt) &= (Fp4-Fp2)\times r \\ &= [(A_4-B_4)-(A_2-B_2)]\times r \times K \end{aligned} \quad (6)$$

where H is the angular momentum of the gyro rotor 20. Thus, the following equations (7) are obtained:

$$d\phi_x/dt=[(A_3-B_3)-(A_1-B_1)]\times Kr/H$$

$$d\phi_y/dt=[(A_4-B_4)-(A_2-B_2)]\times Kr/H \quad (7)$$

In this way, the X-gyro calculation unit 51 and the Y-gyro calculation unit 53 are supplied with the terminal outputs $A_1$, $B_1$, $A_2$, $B_2$, $A_3$, $B_3$, $A_4$, $B_4$ of the four transformers and output the X-gyro signal $d\phi_x/dt$ and the Y-gyro signal $d\phi_y/dt$, respectively.

An arrangement and operation of the X-acceleration calculation unit 53 will be described. The x-acceleration calculating unit 53 includes an addition unit 53-1 for receiving output signals $a_1$, $b_1$, of the first pair of rectifying units 51-5, 51-6 of the X-gyro calculation unit 51, an addition unit 53-2 for receiving output signals $a_3$, $b_3$ of the second pair of rectifying units 51-7, 51-8 and a subtraction unit 53-3 connected to the two addition units 53-1 and 53-2.

The addition units 53-1 and 53-2 calculate sums $a_1+b_1$ and $a_3+b_3$ of tile inside outputs of the X-gyro calculation unit 51. These sums $a_1+b_1$ and $a_3+b_3$ correspond to the sums $A_1+B_1$ and $A_3+B_3$ of the voltages applied to the respective electrodes. Therefore, the outputs of the addition units 53-1 and 53-2 correspond to the forces Fx1 and Fx3 in the X axis direction, respectively.

The subtraction unit 53-3 calculates a difference of $(a_1+b_1)-(A_3+b_3)$ of the outputs $a_1+b_1$ and $a_3+b_3$ of the addition units 53-1 and 53-2. The difference $(a_1+b_1)-(a_3+b_3)$ corresponds to the difference $(A_1+B_1)-(A_3+B_3)$. Therefore, the output from the subtraction unit 53-3 corresponds to the difference between the force Fx1 in the positive direction of the X axis and the force Fx3 in the negative direction of the X axis.

In this way, the subtraction unit 53-3 outputs the signal indicative of the displacement $\Delta x$ expressed by the equation (3) to thereby calculate an acceleration $\alpha x$.

The arrangements and operations of the Y-gyro calculation unit 61 and the Y-acceleration calculation unit 63 are similar to those of the X-gyro calculation unit 51 and the X-acceleration calculation unit 53 and therefore need not be described.

Figure 8:
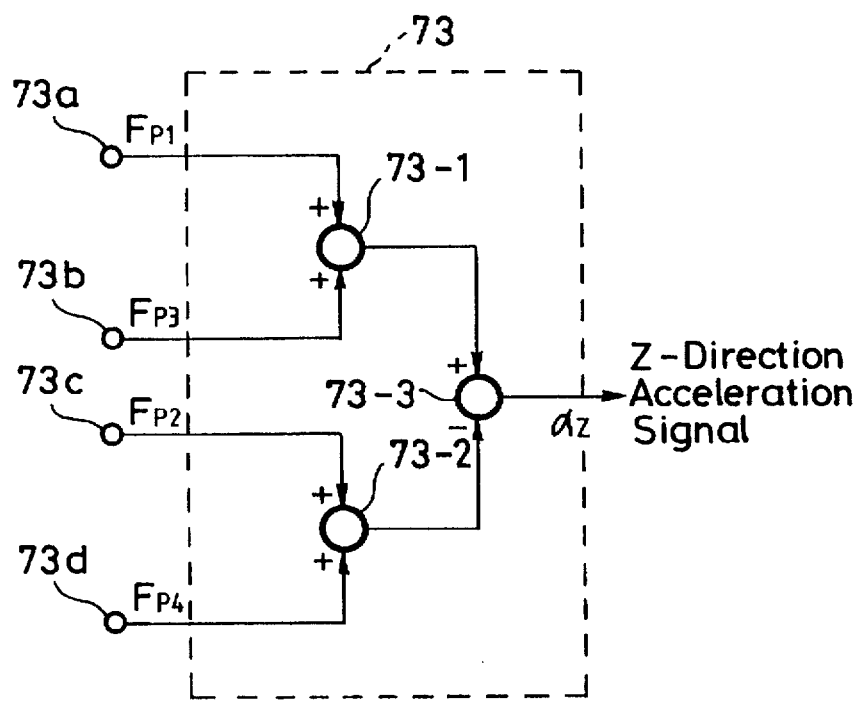
FIG. 8 is a diagram showing an arrangement of an example of a Z-axis acceleration calculation unit of the gyro apparatus according to the present invention.

An arrangement and operation of the Z-acceleration calculation unit 73 will be described with reference to FIG. 8. The Z-acceleration calculation unit 73 calculates an acceleration $\alpha_z$ in the Z-axis direction from the inside signals $a_1$, $b_1$ and $a_3$, $b_3$ of the X-gyro calculation unit 51 and the inside signals $a_2$, $b_2$, and $a_4$, $b_4$ of the Y-gyro calculation unit 61 supplied thereto.

The operation of the Z-acceleration calculation unit 73 will be described. While the calculation is performed under assumption that the mass of the gyro rotor 20 is zero as described above, the mass of the gyro rotor 20 is not zero in actual practice. Let it be assumed that m is the mass of the gyro rotor 20 and that the mass m is divided into four masses. Further, if the acceleration $\alpha_z$ acts on the gyro rotor 20 in the Z-axis direction, then the forces Fp1, Fp3 acting on the first and third portions $P_1$, $P_3$ of the gyro rotor 20 are respectively expressed by the following equations (8):

$$Fp1 = m\alpha_z/4 - (H/r)(d\phi_1/dt)$$

$$Fp3 = m\alpha_z/4 - (H/r)(d\phi_3/dt) \qquad (8)$$

Calculating the sum of the above-mentioned two equations, we have the acceleration $\alpha_z$ in the Z-axis direction:

$$\begin{aligned}\alpha_z &= (Fp1 + Fp3) \times 2/m \\ &= [(A_3 - B_3) + (A_1 - B_1)] \times 2K/m\end{aligned} \qquad (9)$$

Incidentally, it is possible to obtain the acceleration $\alpha_z$ in the Z-axis direction by the forces Fp2, Fp4 acting on the second and fourth portions $P_2$, $P_4$ of the gyro rotor 20. Therefore, the Z acceleration calculation unit 73 according to this embodiment can calculate the Z-axis direction acceleration $\alpha_z$ by the four forces Fp1, Fp2, Fp3, Fp4 acting on the four portions of the gyro rotor 20.

Figure 9A:
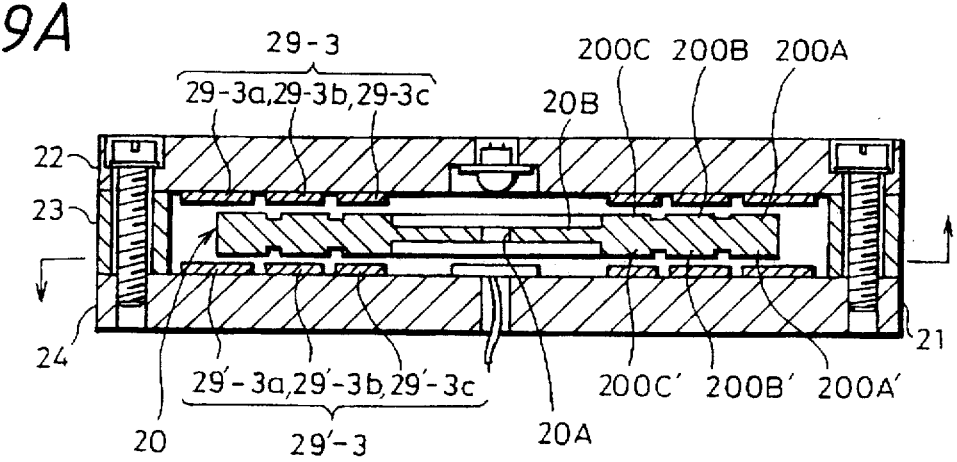
FIGS. 9A and 9B are respectively a cross-sectional view and a plan view showing the gyro apparatus according to a second embodiment of the present invention.
Figure 9B:
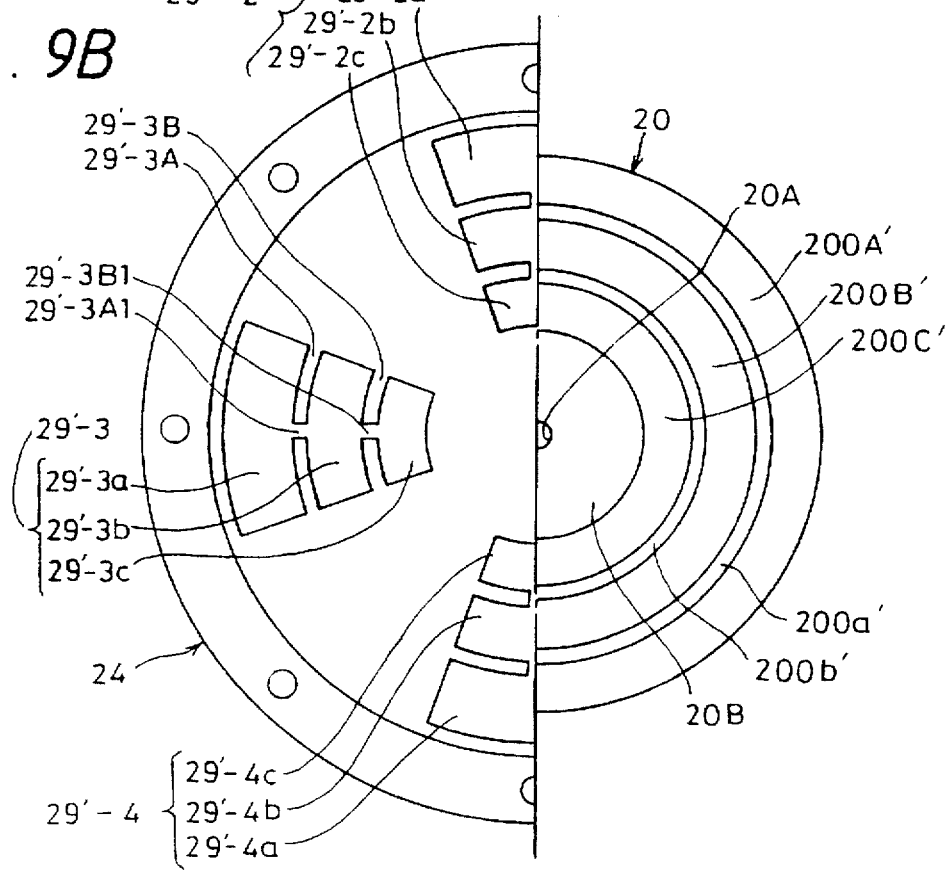

FIGS. 9A, 9B show the gyro apparatus according to a second embodiment of the present invention. According to this embodiment, as illustrated, the gyro rotor 20 is divided by circumferential dividing lines to provide a plurality of annular segments. A plurality of annular slots 200a, 200b and 200a', 200b' are coaxially formed on the upper and lower surfaces of the gyro rotor 20. The annular slits 200a, 200b and 200a', 200b' and a hollow or depression portion of the center portion 20B constitute projected annular segments, i.e., annular electrode portions 200A, 200B, 200C and 200A', 200B', 200C'.

The gyro case 21 includes first, Second, third and fourth pairs of electrostatic supporting electrodes 29-1, 29'-1; 29-2, 29'-2; 29-3, 29'-3; and 29-4, 29'-4 disposed therein. These electrostatic supporting electrodes may preferably formed as arcuate and each of them is segmented by a plurality of annular slits coaxially disposed to provide annular segments. By way of example, the lower-side electrostatic supporting electrode 29'-3 of the third pair of the electrostatic supporting electrodes 29-3, 29'-3 is segmented by two slits 29'-3A, 29'-3B to provide three segments 29'-3a, 29'-3b, 29'-3c. Adjacent segments are coupled by coupling portions 29'-3A1, 29'-3B1, whereby the respective segments are electrically connected.

The annular electrode portions 200A, 200B, 200C and 200', 200B', 200C' of the gyro rotor 20 and the annular segments of the respective electrostatic supporting electrodes have corresponding dimensions in the radial direction and are disposed at the corresponding positions in the radial direction.

A positional relationship between the electrode portion of the gyro rotor 20 and the first pair of the electrostatic supporting electrodes 29-1, 29'-1, for example, will be described below. The first segments 29-1a, 29'-1a of the first pair of the electrostatic supporting electrodes 29-1, 29'-1 correspond to the first electrode portions 200A, 200A' of the gyro rotor 20. Similarly, the second segments 29-1b, 29'-1b correspond to the second electrode portions 200B, 200B', and the third segments 29-1c, 29'-1c correspond to the third electrode portions 200C, 200C'.

Similarly to the first embodiment of the present invention, although the respective electrode portions 200A, 200B, 200C and 200A', 200B', 200C' of the gyro rotor 20 are disposed coaxially to the respective corresponding segments of the electrostatic supporting electrodes they are displaced to the inside or outside in the radial direction simultaneously.

By way of example, the first electrode portions 200A, 200A' of the gyro rotor 20 are displaced relative to the first segments 29-1a, 29'-1a of the first pair of the electrostatic supporting electrode 29-1, 29'-1 to the inside or outside in the radial direction. The second electrode portions 200B, 200B' are displaced relative to the second segments 29-1b, 29'-1b in the inside in outside of the radial direction. The third electrode portions 200C, 200C' are displaced relative to the third segments 29-1c, 29'-1c to the inside or outside in the radial direction.

The case that the electrode portions 200A, 200B, 200C, 200A', 200B', 200C' of the gyro rotor 20 are displaced relative to the respective segments of the first pair of the corresponding electrostatic supporting electrodes to the inside in the radial direction will be described below. The inner diameter of the first electrode portions 20A, 200A' of the gyro rotor 20 is smaller than that of the first corresponding segments 29-1a, 29'-1a, and outer diameter of the first electrode portions 200A, 200A' is smaller than that of the first corresponding segments 29-1a, 29'-1a. Similarly, the inner diameters of the second electrode portions 200B, 200B' and the third electrode portions 200C, 200C of the gyro rotor 20 are smaller than those of the corresponding second segments 29-1b, 29'-1b and the corresponding third segments 29-ic, 29'-1c, respectively, and the outer diameters of the second electrode portions 200B, 200B' and the third electrode portions 200c, 200C' are smaller than those of the corresponding second segments 29-1b, 29'-1b and the corresponding third segments 29-1c, 29'-1c, respectively.

This is also true for the case that the respective electrode portions 200A, 200B, 200C, 200A', 200B', 200C' of the gyro rotor 20 are displaced relative to the corresponding first pair of the segments to the outside in the radial direction. Further, this is also true in the positional relationship between the electrode portions of the gyro rotor 20 and the second, third, and fourth pairs of the electrostatic supporting electrodes 29-2, 29'-2, 29-3, 29'-3, 29-4, 29'-4.

Since the respective electrode portions of the gyro rotor 20 are displaced relative to the respective segments of the first pair of electrostatic supporting electrodes to the inside or outside in the radial direction, owing to similar action that had been described so far in the first embodiment, the first and third forces Fx1, Fx3 acting on the gyro rotor 20 to the outside or inside in the radial direction are generated and magnitudes thereof are increased.

Since the gyro rotor 20 includes a plurality of the electrode portions 200A, 200B, 200C, 200A', 200B', 200C' and the electrostatic supporting electrodes are segmented to provide a plurality of segments in response thereto, a changing ratio of electrical energy ($E=CV^2/2$) accumulated between the gyro rotor 20 and the electrostatic supporting electrodes when the gyro rotor 20 is displaced in the radial direction is increased. The changing ratio of the electrical energy is increased substantially in proportion to the number of the segmented electrode portions and the number of the segments. Therefore, it is possible to increase the magnitudes of the forces Fx1, Fx3 acting on the gyro rotor 20 to the outside in the radial direction by increasing the number of the segmented electrode portions and the segments.

The gyro apparatus according to a third embodiment of the present invention will be described below with reference to FIGS. 10A, 10B. The third embodiment shows a modified example of the second embodiment according to the present invention shown in FIGS. 9A, 9B. According to this embodiment, the gyro rotor 20 includes a disk-shaped member 20G made of an insulating material, and electrode portions 202A, 202B, 202C, 202D and 202A', 202B', 202C', 202D' are coated or attached on the upper and lower surfaces of the disk-shaped member 20G.

The disk-shaped member 20G may be made of an arbitrary material and may preferably be made of a transparent material, such as quartz glass or the like. It the disk-shaped member 20G is made of the transparent material, then the displacement detection center hole 20A may be replaced with displacement detection holes bored through the center electrode portions 202D, 202D'.

The electrode portions may he formed by desired thin film forming techniques, such as vapor deposition, ion plating, photo-fabrication or the like. Also, the electrode portions may be formed of thin films of metals, such as titanium, aluminum or the like.

The outer diameter of the gyro rotor 20 may be 5 mm or smaller and a thickness thereof may be 0.1 mm or thinner. A thickness of the metal thin film electrode portion may be 1 μm or smaller. The mass of the gyro rotor 20 may be 10 mg or smaller.

Figure 10A:
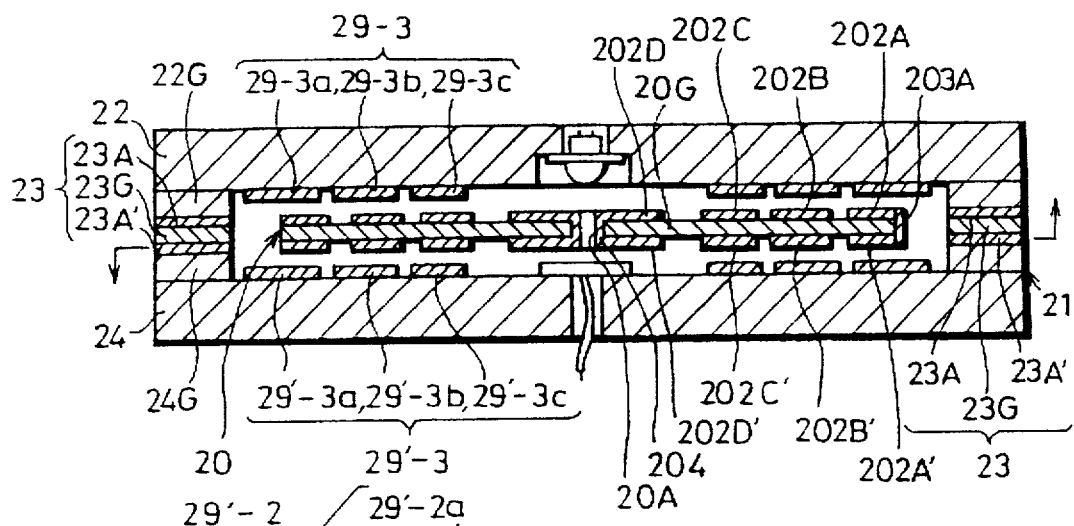
FIGS. 10A and 10B are respectively a cross-sectional view and a plan view showing the gyro apparatus according to a third embodiment of the present invention.
Figure 10B:
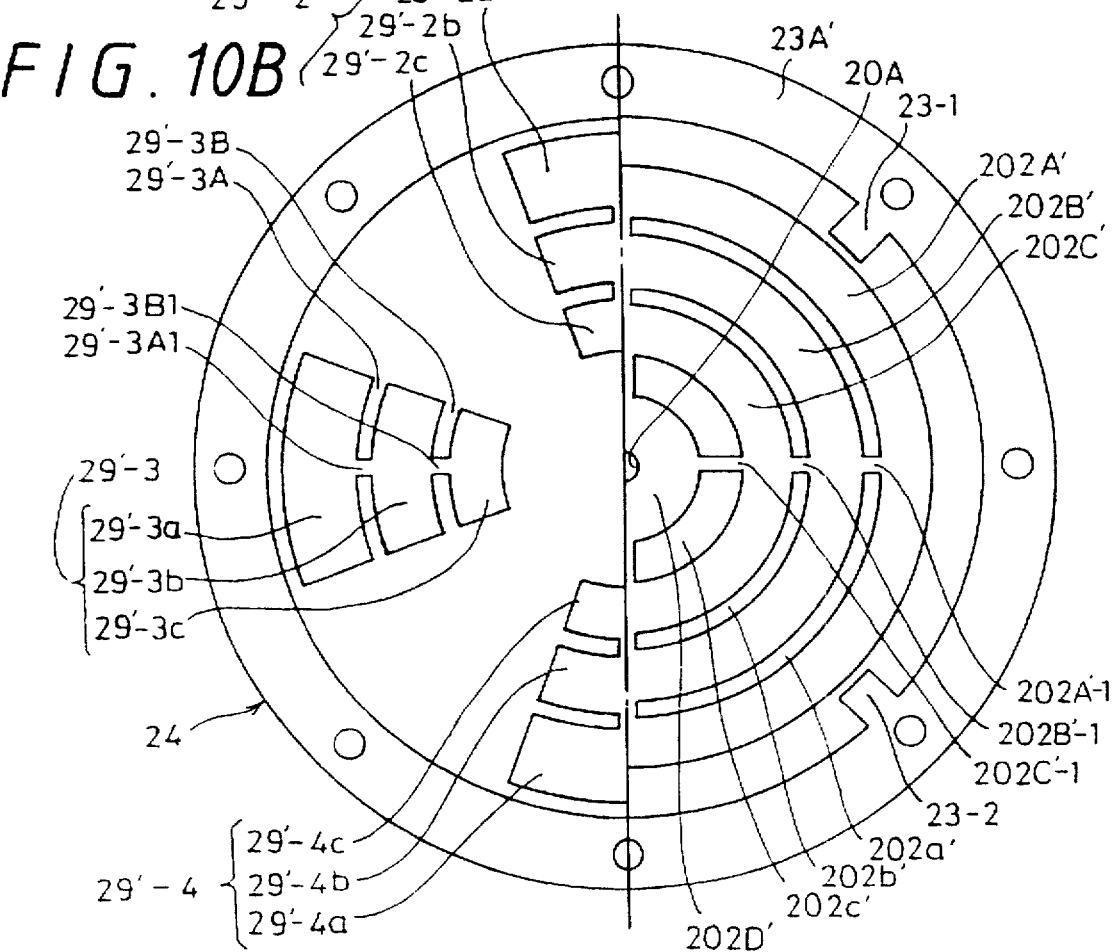

As shown in FIGS. 10A and 10B, the gyro case 21 includes, on its inner surfaces at the upper and lower sides of the gyro rotor 20, a plurality of arcuate electrostatic supporting electrodes 29-1 to 29-4, 29'-1 to 29'-4. The electrostatic supporting electrodes 29-1 to 29-4, 29'-1 to 29'-4 may be similar to those of the second embodiment shown in FIGS. 9A, 9B.

It should be preferable that the electrode portions 202A, 202B, 202C, 202D provided on the upper surface of the gyro rotor 20 are electrically connected to the corresponding electrode portions 202A', 202B', 202C', 202D' provided on the lower surface. Thus, the pairs of the electrode portions 202A 202A–202A', 202B–202B', 202C–202C' and 202D–202D' of each of the pairs can be maintained at the same potential. Incidentally, all electrode portions provided on the upper and lower surfaces of the gyro rotor 20 may be connected electrically.

FIG. 10B shows the electrode portions coated or attached on the lower surface of the gyro rotor 20. The electrode portions include three coaxial annular electrode portions 202A', 202B', 202C' and one center electrode portion 202D'. Annular non-electrode portions 202a', 202b', 202c' are formed between the adjacent electrode portions. The three annular electrode portions 202A', 202B', 202C' constitute the slave control system and the central position control system.

The center electrode portion 202D' constructs a rotor driving motor of the rotor driving system 100 as described above. When an eddy current is generated in the inside of the center electrode portion 202D', the center electrode portion 202D' generates a torque to rotate the gyro rotor 20. The center electrode portion 202D' may be circular as shown in FIG. 10B or proper shape.

The adjacent two electrode portions 202A' and 202B', 202B' and 202C, 202C' and 202D' are connected together by the coupling portions 202A'-1, 202B'-1, 202C'-1 which are provided between the electrode portions in the radial direction. In this way, the electrode portions 202A', 202B', 202C' and 202D' coated or attached on the lower surface of the gyro rotor 20 are connected electrically.

The electrode portions 202A, 202B, 202C, 202D coated or attached on the upper surface of the gyro rotor 20 are firmed similarly to the electrode portions 202A', 202B', 202C', 202D' coated or attached on the lower surface of the gyro rotor 20.

The electrode portions 202A, 202B, 202C, 202D coated or attached on the upper surface of the gyro rotor 20 are electrically connected with the electrode portions 202A', 202B', 202C', 202D' coated or attached on the lower surface of the gyro rotor 20. By way of example, a Connection portion 204 is formed on the inner surface of the central hole 20A of the gyro rotor 20 or a connection portion 203A is formed on the outer circumferential surface of the gyro rotor 20, by which the electrode portions 202A, 2021, 202C, 202D are electrically connected with the electrode portions 202A', 202B', 202C', 202D'.

A description will be given on a positional relationship between the electrode portions 202A, 202B, 202C coated or attached on the upper surface of the gyro rotor 20 and the electrostatic supporting electrodes 29-1 to 29-4 disposed on the gyro case 21 in response to the electrode portions 202A, 202B, 202C and a positional relationship between the electrode portions 202A', 202B', 202C' coated or attached on the lower surface of the gyro rotor 20 and the electrostatic supporting electrodes 29'-1 to 29'-4 disposed on the gyro case 21 in response to the electrode portions 202A', 202A', 202C'.

The positional relationship between the electrostatic supporting electrodes of tho gyro case 21 and the electrode portions of the gyro rotor 20 is similar to that of the second embodiment shown in FIGS. 9A, 9B. Specifically, the electrode portions 202A, 202B, 202C and 202A', 202B', 202C' of the gyro rotor 20 and the electrostatic supporting electrodes 29-1 to 29-4 and 29'-1 to 29'-4 disposed on the gyro case 21 in response thereto have corresponding radial-direction dimensions and are disposed at corresponding radial-direction positions.

Although the electrode portions 202A, 202B 202C and 202A', 202B', 202C' of the gyro rotor 20 are coaxially disposed relative to the electrostatic supporting electrodes 29-1 to 29-4 and 29'-1 to 29'-4 of the gyro case 21, they are displaced to the inside or outside in the radial direction at the same time.

A positional relationship between the electrode portions 202A, 202B, 202C and 202A', 202B', 202C' of the gyro rotor 20 and the first pair of the electrostatic supporting electrodes will be described below. The first segments 29-1a, 29'-1a of the first pair of the electrostatic supporting electrodes correspond to the first electrode portions 202A, 202A' of the gyro rotor 20. Similarly, the second segments 29-1b, 29'-1b of the first pairs of the electrostatic supporting electrodes correspond to the second electrode portions 202B, 202B', and the third segments 29-1c, 29'-1c of the first pair of the electrostatic supporting electrodes correspond to the third electrode portions 202C, 202C'.

A description will be given on the case that, as shown in FIGS. 10A, 10B, each of the electrode portions 202A, 202B, 202C and 202A', 202B', 202C' costed or attached on the gyro rotor 20 is displaced relative to each of the respective segments of the corresponding first pair of the electrostatic supporting electrodes to the inside in the radial direction. The inner diameter of the first electrode portions 202A, 202A' of the gyro rotor 20 is smaller than that of the corresponding first segments 29-1a, 29'-1a, and the outer diameter of the first electrode portions 202A, 202A' is smaller than that of the corresponding first segments 29-1a, 29'-1a.

Similarly, the inner diameters of the second electrode portions 202B, 202B' and the third electrode portions 202C, 202C' of the gyro rotor 20 are smaller than those of the corresponding second segments 29-1b, 291-1b and the corresponding third segments 29-1x, 29'-1c, and the outer diameters of the second electrode portions 202B, 202' and the third electrode portions 202C, 202C' are smaller than those of the corresponding second segments 29-1b, 29'-1b and the corresponding third segments 29-1c, 29'-1c, respectively.

This is also true for the case that the electrode portions 200A, 200B, 200C and 200A', 200B', 200C' of the gyro rotor 20 are displaced relative to the respective segments of the corresponding first electrostatic supporting electrodes to the outside in the radial direction. Further, this is also true in the positional relationship between the electrode portions of the gyro rotor 20 and the second, third and fourth pairs of the electrostatic Supporting electrodes 29-2, 29'-2; 29-3, 29'-3; and 29-4, 29'-4.

Since the respective electrode portions of the gyro rotor 20 are displaced relative to the respective segments of the first pair of the electrostatic supporting electrodes to the inside or outside in the radial direction, owing to similar action that had been described so-far with reference to the first and second embodiments, the forces Fx1, Fx3 acting on the gyro rotor 20 to the outside or inside in the radial direction are generated and the magnitudes thereof are increased.

As shown in FIG. 10A, an annular spacer 23 is inserted between the upper side bottom member 22 and the lower side bottom member 24 of the gyro case 21 so as to surround the gyro rotor 20. The annular spacer 23 includes an annular supporting member 23G and adjustment film 23A, 23A' attached to both surfaces of the annular supporting member 23G. The spacer 23 may be produced at the same time or by a similar method that the gyro rotor 20 is produced as will be described later on. In that case, the annular supporting member 23G of the spacer 23 is made of the same insulating material as that of the disk-shaped member 20G of the gyro rotor 20, and the adjustment films 23A, 23A' of the spacer 23 are formed of a metal thin film similar to that used in the electrode portions of the gyro rotor 20. Thus, the spacer 23 and the gyro rotor 20 can be produced accurately with the same thickness.

An annular gap adjustment ring 22G may be attached to the upper side bottom member 22 in response to the spacer 23, and an annular gap adjustment ring 24G may be attached to the lower side bottom member 24 in response to the spacer 23. The gap adjustment rings 22G, 24G may be a metal thin film formed similarly by the thin film forming technique.

When the gyro apparatus is assembled, it is possible to set the spacing between the gyro rotor 20 and the gyro case 21 to an optimum value by adjusting the thickness of the gap adjustment rings 22G, 24G or adjusting both the gap adjustment rings 22G, 24G and the adjustment films 23A, 23A' of the spacer 23. Incidentally, while the gap adjustment rings 22G, 24G and the adjustment films 23A, 23A' are separately constructed as described above, the present invention is not limited thereto and the following variant is also possible. That is, the gap adjustment ring 22G of the upper side bottom member 22 and the upper adjustment film 23A of the spacer 23 may be formed integrally, and the gap adjustment ring 24G of the lower side bottom member 24 and the lower adjustment film 23A' of the spacer 23 may be formed integrally.

The spacer 23 includes stopper portions 23-1 to 23-4 as shown in FIG. 10B. The displacement of the gyro rotor 20 in the radial direction is restricted by the stopper portions 23-1 to 23-4. A spacing between the tops of the stopper portions 23-1 to 23-4 and the outer edge portion of the gyro rotor 20 is set properly. While the stopper portions 23-1 to 23-4 are formed as a plurality of protrusions projected to the inside in the radial directions the present invention is not limited thereto and the stopper portions 23-1 to 23-4 may be formed annular.

Figure 11:
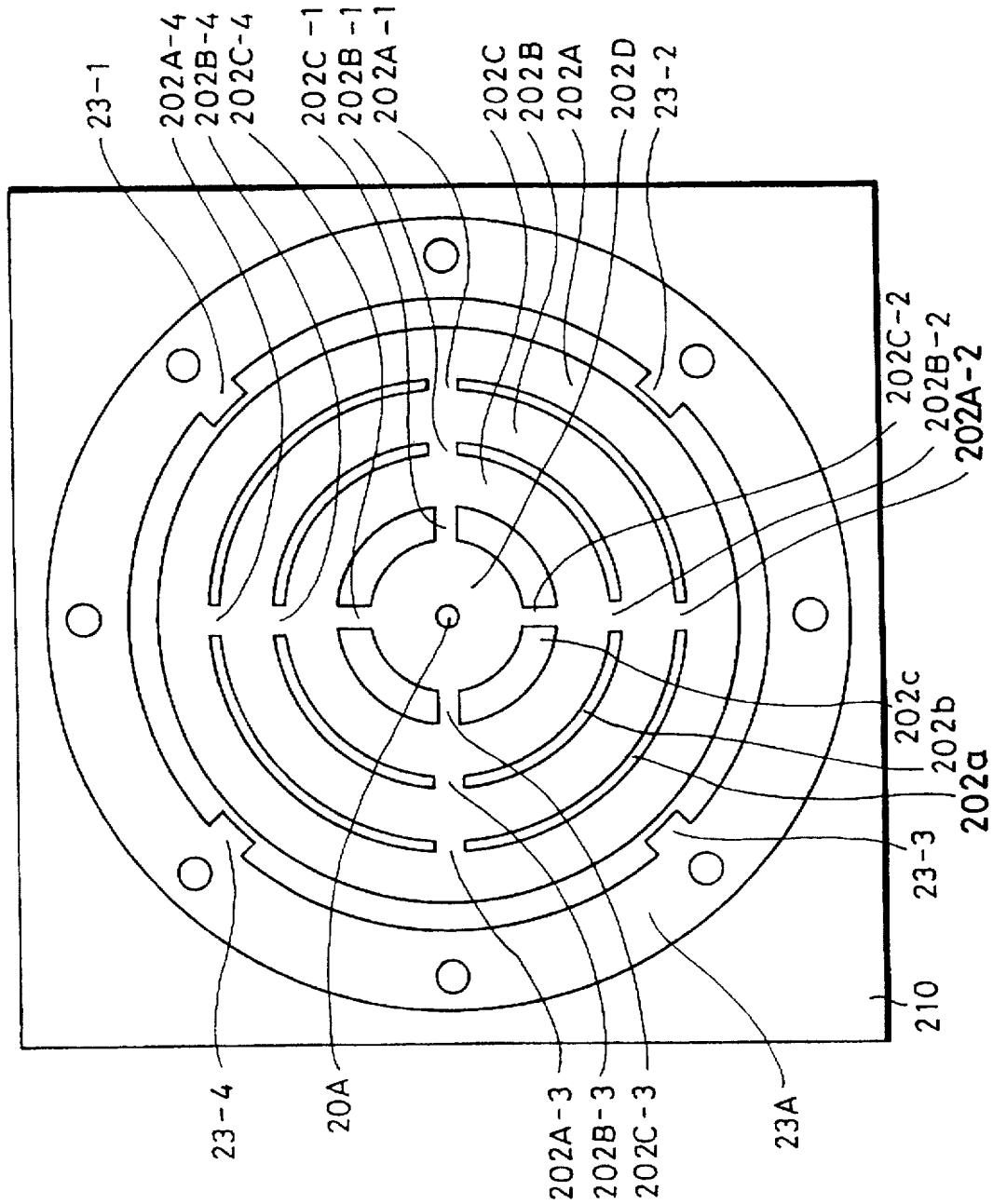
FIG. 11 is a plan view used to explain a method of manufacturing the gyro apparatus according to the third embodiment of the present invention.

A method of manufacturing the gyro apparatus, in particular, a method of manufacturing the gyro rotor 20 according to the present Invention will be described below with reference to FIG. 11. The gyro rotor 20 and the spacer 23 may preferably be manufactured by the same process or a series of processes. Initially, a thin plate member 210 made of a transparent insulating material, such as quartz glass is prepared. The plate member 210 may be rectangular as shown in FIG. 11 and has a dimension large enough so that a plurality of gyro rotors 20 and a plurality of spacer 23 may be cut out from one plate member 210.

The metal thin film electrode portions 202A, 202B, 202C, 202D and 202A', 202B', 202C', 202D' and the adjustment films 23A, 23A' are formed on both surfaces of the plate member 210 by some suitable thin film forming techniques.

According to the embodiment of the present invention, because the metal thin film is attached to the transparent plate member 210, a self-align exposure becomes possible. According to the self-align exposure, initially, the electrode portions 202A, 202B, 202C, 202D and the adjustment film 23A are formed on one surface of the plate member 210. Then, a photo-sensitive agent is coated on the other surface of the plate member 210 and the plate member 210 is exposed from the side of the electrode portions 202A, 202B, 202C, 202D and the adjustment film 23A that had already been formed. The electrode portions 202A', 202B', 202C' 202D' and the adjustment film 23A' are formed on the other surface of the plate member 210 by using a lithography technique. The same shape can be drawn coaxially on both surfaces accurately by the self-align exposure.

The adjustment films 23A, 23A' may be made independently of or made of a material different from that of the electrode portions 202A, 202B, 202C, 202D. Subsequently, the gyro rotor 20 and the spacer 23 are detached from the plate member 210 by cutting. The cutting order is not limited. By way of example, the gyro rotor 20 is detached from the plate member 210- by cutting the plate member 210 along the outer periphery of the gyro rotor 20. Then, the spacer 23 is detached from the plate member 210 by cutting the plate member 210 along the inner periphery of the spacer 23 and the stopper portions 23-1 to 23-4 and by further cutting the plate member 210 along the outer periphery of the spacer 23. The cutting may be effected by etching, for example.

Then, there is formed a metal thin film connection portion 203A and/or 204 which is used to electrically connect the electrode portions 202A, 202B, 202C, 202D provided on the upper surface of the gyro rotor 20 and the electrode portions 202A' 202B', 202C', 202D' provided on the lower surface of the gyro rotor 20 commonly. The connection portion 203A and/or 204 may be formed by some suitable thin film forming techniques.

An insulating film is formed by oxidizing the surfaces of the electrode portions 202A, 202B, 202C, 202D and 202A', 202B', 202C', 202D' and 203A and/or 204. The insulating film insulates the electrode portions 202A, 202B, 202C, 202D and 202A', 202B', 202C', 202D' from tie electrostatic supporting electrodes 29-1 to 29-4, 29'-1 to 29'-4 provided on the gyro case 21, thereby forming a capacitor therebetween. The insulating film protects the electrode portions and therefore the gyro rotor 20 can be prevented from contacting with the gyro case 21.

As described above, according to the embodiments of the present invention, the electrode portions 202A, 202B, 202C, 202D formed on the upper surface of the gyro rotor 20 and the electrode portions 202A', 202B', 202C', 202D' formed on the lower surface of the gyro rotor 20 can be formed to be coaxial with each other in the same shape with high accuracy. Since the spacer 23 is manufactured with the same process as that of the gyro rotor 20 by using the same raw material as that of the gyro rotor 20, when the gyro apparatus is assembled, the positional relationship between the spacer 23 and the gyro rotor 20 can be reproduced as the same positional relationship as that provided when the electrode portions 202A, 202B, 202C, 202D and 202A', 202B', 202C', 202D' and the adjustment films 23A, 23A' are formed on the plate member 210 shown in FIG. 11.

Therefore, in the assembled gyro apparatus, it is possible to set the spacing between the top portions of the stopper portions 23-1 to 23-4 and the outer periphery of the gyro rotor 20 with ease accurately.

According to the embodiments of the present invention, since the electrode portions 202A, 202B, 202C, 202D and 202A', 202B', 202C', 202D' formed on both surfaces of the gyro rotor 20 are positively separated from each other by the surrounding insulating portion, the changing amount of electrical energy ($E=CV^2$) relative to the displacement of the gyro rotor 20 can be increased, and a large position control power can be generated. Thus, it is possible to provide a sensor of a wide dynamic range.

According to the embodiments of the present invention, since the gyro rotor 20 includes the electrode portions which are formed by forming the metal thin film on the transparent insulating material by utilizing the thin film forming technique, the electrode portions on both surfaces of the gyro rotor 20 can be formed coaxially and symmetrically.

According to the embodiments of the present intention, since the electrode portions of the gyro rotor 20 are formed by forming the metal thin film according to the thin film forming technique, it is possible to produce the gyro rotor 20 which is extremely light-weighted.

According to the present invention, since the gyro rotor 20 is disk-shaped, it is possible to produce a gyro apparatus which is inexpensive and high in accuracy.

According to the present invention, since the gyro rotor 20 is disk-shaped and is made of a single crystal metal, such as a silicon, it is possible to produce a gyro apparatus of high accuracy which can be protected from being affected by the change of temperature and the aging change.

According to the present invention, since the gyro rotor 20 is disk-shaped and is made of a single crystal metal, such as silicon, the gyro apparatus of the present invention can be mass-produced by some suitable methods, such as lithography.

According to the present invention, since the major parts or the gyro apparatus, such as the disk-shaped gyro rotor 20, the upper side bottom member, the lower side bottom member and the annular spacer constituting the gyro case 21 or the like can be mass-produced by some suitable mass-production techniques, such as lithography, it is possible to provide an inexpensive gyro apparatus.

According to the present invention, since the gyro rotor 20 is produced by forming metal thin film-shaped electrodes on the disk-shaped member 20G made of the insulating material by the thin film forming technique, it is possible to produce an extremely-miniaturized gyro rotor 20 with nigh accuracy efficiently.

According to the present invention, since the gyro rotor 20 is produced by forming metal thin film-shaped electrodes on the disk-shaped member 20G made of the insulating material by the thin film forming technique, the electrodes of the gyro rotor can be formed of a plurality of extremely-miniaturized segments. Thus, it is possible to increase a changing ratio of electrical energy ($E=CV^2$) accumulated between the electrode portions of the gyro rotor 20 and the electrostatic supporting electrodes of the gyro case 21.

According to the present invention, since the gyro rotor 20 is produced by forming metal thin film-shaped electrodes on the disk-shaped member 20G made of a transparent insulating material, the electrodes can be formed on both surfaces of the gyro rotor 21 coaxially and in the same shape by self-align exposure.

According to the present invention, since the gyro rotor 20 and the spacer 23 can be produced by the same process or a series of processes simultaneously by forming the metal thin film-shaped electrodes and adjustment films on the plate member 210 made of the insulating-material by a thin film forming technique the manufacturing process of the gyro apparatus can be made efficient.

According to the present invention, since the gyro rotor 20 and the spacer 23 can be produced by the same process or a series of processes simultaneously by forming the metal thin film-shaped electrodes and adjustment films on the plate member 210 made of the insulating material by a thin film forming technique, the position of the spacer 23 relative to the gyro rotor 20 can be set accurately in the assembled gyro apparatus.

According to the present invention, since the accelerations around the X axis and Y axis can be detected by dividing, adding and subtracting the AC voltage applied to the four pairs of the electrostatic supporting electrodes, it is possible to obtain the gyro apparatus which can detect two accelerations which are perpendicular to the spin axis.

According to the present invention, since the angular velocities in the spin axis direction (Z-axis direction), the X-axis direction and Y-axis direction can be detected by dividing, adding and subtracting the AC voltage applied to the four pairs of the electrostatic supporting electrodes, it is possible to obtain the gyro apparatus having five functions as an inertia sensor.

Further, according to the present invention, the displacements of the gyro rotor 20 in the X-axis and Y-axis directions can be detected by the simple position detecting apparatus having the light emitting device and the photo-sensing device.

Furthermore, according to the present invention, the displacements of the gyro rotor 20 in the X-axis and Y-axis directions are detected by the simple position detecting apparatus including the light ' emitting devices and the photo-sensing devices. Also, an electrostatic force acting on the gyro rotor 20 is controlled such that the above-mentioned displacements can be canceled. Therefore, the gyro rotor 20 is disposed such that the spin axis thereof is constantly matched with the central axis of the gyro apparatus.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method of manufacturing a gyro apparatus having a thin disk-shaped gyro rotor and a gyro case for accommodating therein said gyro rotor, comprising the steps of: providing a thin plate member made of an insulating material having opposed surfaces; forming thin metal film electrodes on both surfaces thereof; cutting said plate member into circular disks to form a gyro rotor; and simultaneously forming a metal thin film annular spacer and a plurality of stoppers projecting from said spacer to the inside of said disk in the radial direction, said stoppers being formed so as to surround said electrodes and are spaced apart from said electrodes to form the gyro case, said spacer and said stoppers being formed as an integral member with said gyro rotor by cutting portions of said spacer and said stoppers from said plate member wherein said gyro case includes an upper side bottom member and a lower side bottom member, said method including the step of assembling said gyro so that said spacer is disposed between the upper side bottom member and the lower side bottom member so as to dispose said gyro rotor such that a spacing between each of tops of said stoppers and an outer peripheral portion of said gyro rotor becomes the same.

2. A method of manufacturing a gyro apparatus having a thin disk-shaped gyro rotor and a gyro case for accommodating therein said gyro rotor, comprising the steps of: providing a thin plate member made of an insulating material having opposed surfaces; forming thin metal film electrodes on both surfaces thereof; cutting said plate member into circular disks to form a gyro rotor; and simultaneously forming a metal thin film annular spacer and a plurality of stoppers projecting from said spacer to the inside of said disk in the radial direction, said stoppers being formed so as to surround said electrodes and are spaced apart from said electrodes, said spacer and said stoppers being formed as an integral member with said gyro rotor by cutting portions of said spacer and said stoppers from said plate member.

* * * * *